United States Patent [19]
Waki et al.

[11] Patent Number: 5,233,273
[45] Date of Patent: Aug. 3, 1993

[54] DISCHARGE LAMP STARTING CIRCUIT

[75] Inventors: Atsuo Waki, Osaka; Koji Miyazaki, Yawata; Masataka Ozawa, Takarazuka; Takayuki Kamitani, Osaka; Shigeru Horii, Takatsuki, all of Japan

[73] Assignee: Matsushita Electric Industrial Co., Ltd., Osaka, Japan

[21] Appl. No.: 756,571

[22] Filed: Sep. 9, 1991

[30] Foreign Application Priority Data

| Sep. 7, 1990 | [JP] | Japan | 2-238164 |
| Sep. 18, 1990 | [JP] | Japan | 2-249444 |
| Feb. 27, 1991 | [JP] | Japan | 3-032686 |
| Mar. 4, 1991 | [JP] | Japan | 3-037263 |

[51] Int. Cl.⁵ .......... H05B 31/00; H05B 41/14; H05B 41/24
[52] U.S. Cl. .......... 315/224; 315/290; 315/244; 315/DIG. 2; 315/DIG. 7; 315/DIG. 4; 315/307; 315/DIG. 5; 315/246
[58] Field of Search .......... 315/289, 290, 224, 244, 315/DIG. 2, DIG. 5, DIG. 7, 60, DIG. 4, 307, 194, 246; 313/291, 594, 601

[56] References Cited

U.S. PATENT DOCUMENTS

| 2,542,345 | 2/1951 | Miles | 313/594 |
| 3,611,021 | 10/1971 | Wallace | 315/DIG. 5 |
| 4,004,188 | 1/1977 | Cooper | 315/DIG. 7 |
| 4,007,397 | 2/1977 | Lake | 315/60 |
| 4,060,752 | 11/1977 | Walker | 315/244 |
| 4,348,615 | 9/1982 | Garrison et al. | 315/DIG. 7 |
| 4,513,227 | 4/1985 | Labedini et al. | 315/289 |
| 4,704,561 | 11/1987 | Dietl | 315/DIG. 5 |
| 4,749,914 | 6/1988 | Feher et al. | 315/DIG. 7 |
| 4,950,959 | 8/1990 | Becket et al. | 315/DIG. 4 |
| 4,952,846 | 8/1990 | Van Der Burgt et al. | 315/307 |

FOREIGN PATENT DOCUMENTS

61-273183 4/1987 Japan .

OTHER PUBLICATIONS

"Restriking Hot Metal Vapor Lamps-Lamp Characteristic and Circuit Requirements", Elms et al., Journal of IES, Oct. 1975, pp. 26-30.

Primary Examiner—Robert J. Pascal
Assistant Examiner—Michael B. Shingleton
Attorney, Agent, or Firm—Wenderoth, Lind & Ponack

[57] ABSTRACT

When a discharge lamp is started, high voltage pulses which superpose the voltage due to LC resonance of a resonance circuit are supplied to the discharge lamp, and breakdown occurs in the discharge lamp. The pulse energy needed for the high voltage pulses is small and the output power of the resonance circuit can be decreased. After the breakdown, the energy needed for the transfer from glow discharge to arc discharge is supplied by the resonance, and the high voltage pulses used to supply the starting energy are allowed to be stopped. Thus, the starting and restriking of a discharge lamp is sure, and the starting circuit for a discharge lamp can be made more compact.

14 Claims, 17 Drawing Sheets

DISCHARGE LAMP STARTING CIRCUIT

BACKGROUND OF THE INVENTION

1. Field of the Invention

The present invention relates to a discharge lamp starting device for starting a discharge lamp and for controlling lighting.

2. Description of the Prior Art

A practical starting circuit for a discharge lamp such as a metal halide lamp has been available for many years. R. T. Elms, J. C. Engel and G. F. Saletta (Journal of IES, 1975 October, pp. 26–30) analyzed the restriking process and found that the restriking process consists of three relatively independent stages: initial breakdown, hot spot formation and arc establishment.

In order to reduce or substantially remove the harmful electrical migration and sonic resonance which occur generally during the starting of a discharge lamp, a known starting device for a discharge lamp supplies a high electrical voltage generated by an LC resonance to the discharge lamp between a pair of electrodes thereof to excite an excitable component in the discharge lamp, and then supplies a high frequency electrical current having an amplitude within a predetermined range and having a predetermined repetition rate to the pair of electrodes using a high frequency inverter, and then periodically changes the direction of the supplied high frequency current.

For example, FIG. 1 shows such a starting circuit for a discharge lamp disclosed in Japanese laid open Patent Publication No. 273,183/1986. In order to start and light a discharge lamp, a high voltage (resonance voltage) generated by the series resonance of an LC circuit consisting of a capacitor C2 and a choke coil L is supplied to a discharge lamp R. The resonance voltage enables a starting energy larger than an energy generated by applying a high voltage pulse to be supplied to the discharge lamp R. Therefore, the starting characteristic can be improved generally when compared with the technique of applying high voltage pulses. However, in order to start (restrike) a discharge lamp of this kind, a breakdown voltage of a few kilovolts to tens of kilovolts is needed. In order to secure such a high voltage using the series resonance of the LC circuit, it is necessary to supply a resonance current of a few amperes to the capacitor C2 and the choke coil L at the same time. Therefore, the core size of the choke coil L has to be increased in order to prevent the saturation of the choke coil L and the sizes of the choke coil L and the capacitor C2 have to be increased in order to secure the insulation against the high voltage generated at a small size resonance. Thus, the starting device cannot easily be manufactured.

SUMMARY OF THE INVENTION

An object of the present invention is to provide a starting circuit for a discharge lamp which can improve the starting characteristic and can be produced compactly.

A starting circuit for a of discharge lamp, in accordance with the present invention, comprises: (a) a resonance circuit including a series circuit consisting of a coil and a capacitor; (b) a discharge lamp connected in series to the series circuit of said resonance circuit so that the voltage between said coil of said resonance circuit is applied to the discharge lamp; (c) an oscillator circuit which can supply an alternating voltage to said resonance circuit through a driver circuit, and which can oscillate at a first frequency around the resonance frequency of said series circuit and at a second frequency different from the first frequency; (d) a pulse generator connected to said discharge lamp for supplying pulses having a voltage which is high enough to cause a breakdown in said discharge lamp; (e) a detector for detecting a lamp characteristic which can be used to confirm the starting of said discharge lamp; and (f) a lighting controller for controlling the operation of said discharge lamp by making said oscillator circuit oscillate at the first frequency when said detector does not confirm the starting and by making said oscillator circuit stop the resonance of said resonance circuit.

The resonance frequency of the starting circuit for the a discharge lamp can be controlled so that a resonance voltage is generated due to the LC series resonance. Furthermore, the pulse generator supplies high voltage pulses, superposing the resonance voltage, to the discharge lamp. The pulses for starting have a voltage large enough to cause breakdown between the main electrodes of the discharge lamp. Most of the energy needed after the breakdown of discharge lamp, for the transfer of glow discharge to arc discharge, is supplied by the resonance voltage. Thus, the energy needed for generating the pulses may be small, and the voltage of the pulses may be small enough only to start the initial discharge.

It is an advantage that the starting characteristic of the discharge lamp is improved and the starting circuit can be made more compactly.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, in which.

DETAILED DESCRIPTION OF THE PREFERRED EMBODIMENTS

Embodiments of the present invention will be explained below with reference to the accompanied drawings.

EXAMPLE 1

Figure 1:
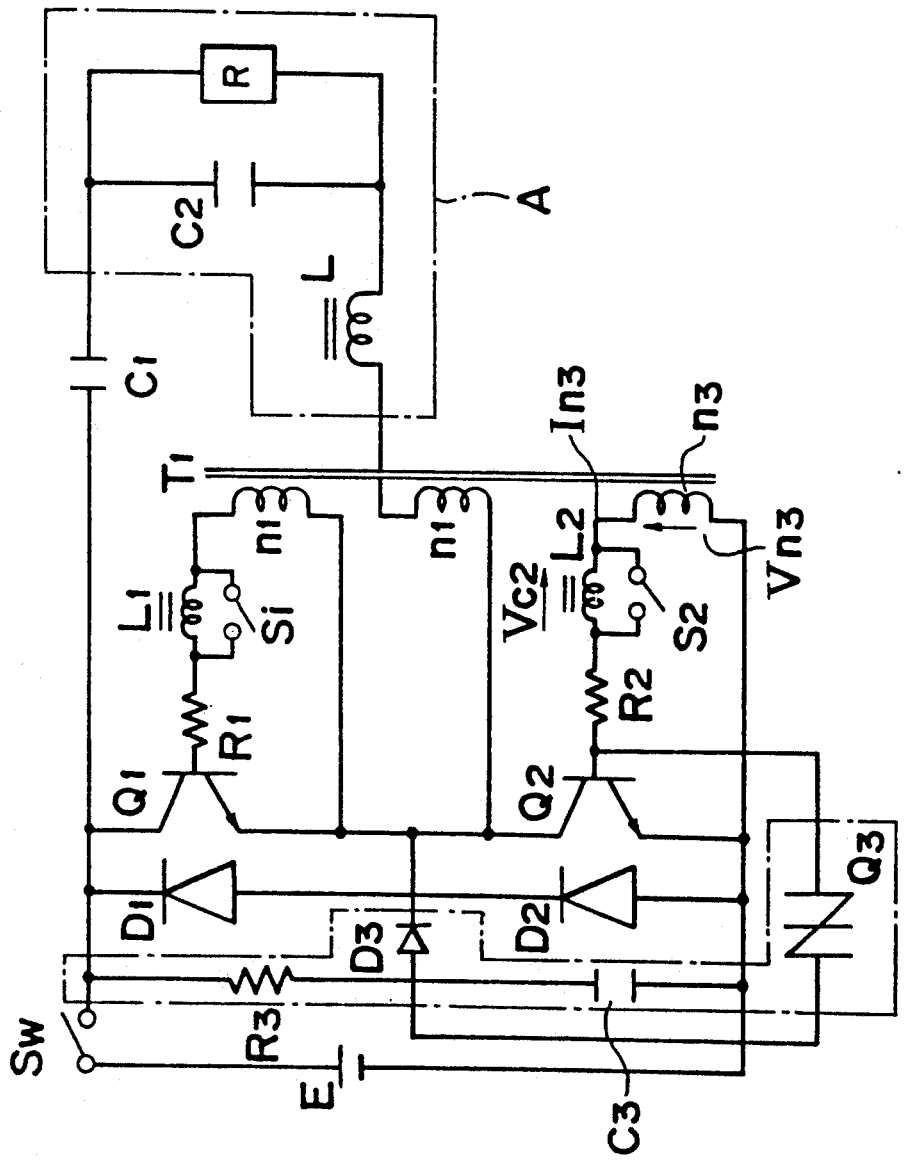
FIG. 1 is a circuit diagram of a prior art starting circuit for a discharge lamp.
Figure 2:
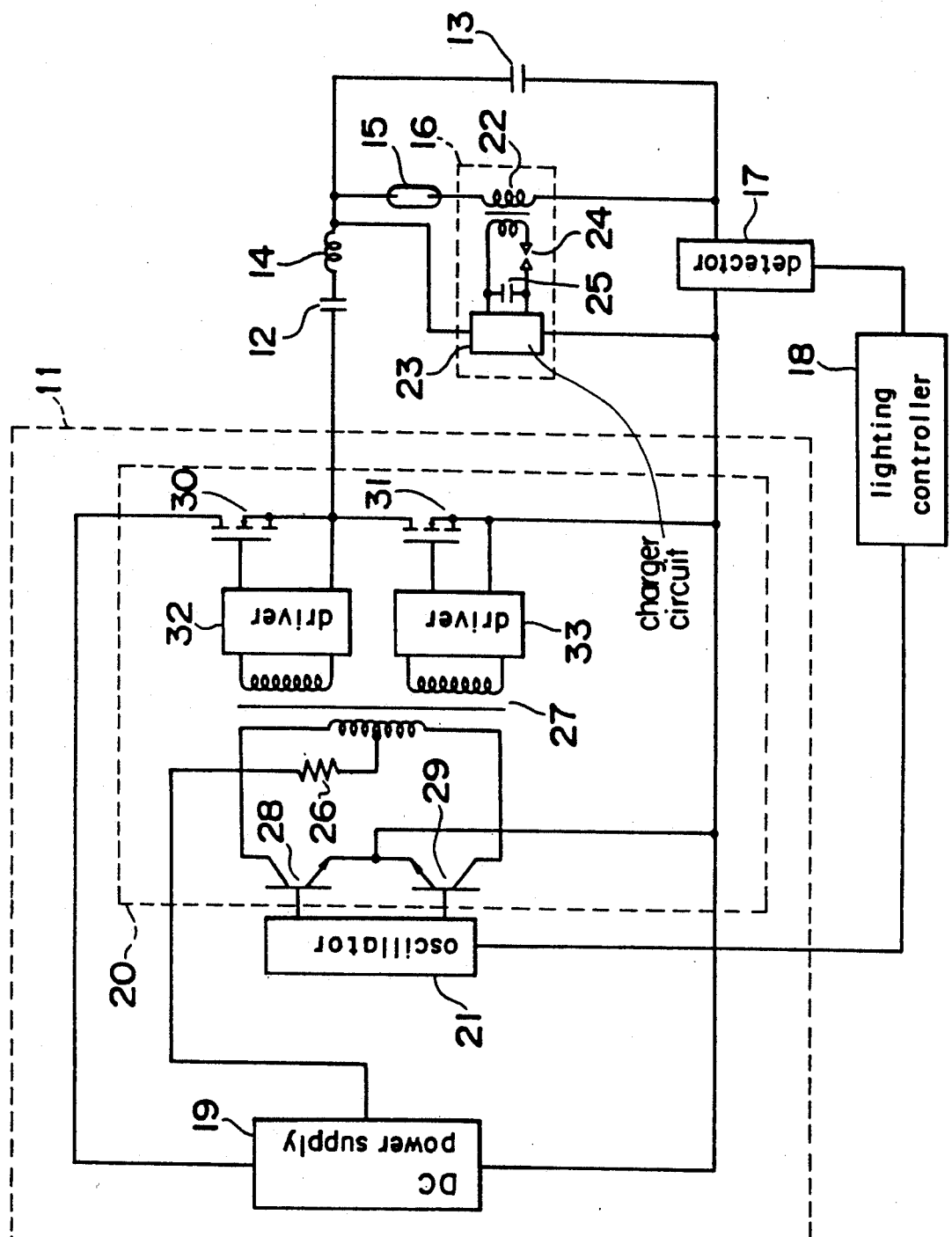
FIG. 2 is a circuit diagram of Example 1 of a starting circuit for a discharge lamp.

FIG. 2 shows a circuit diagram of Example 1 of a starting circuit for a discharge lamp, wherein reference numeral 11 designates a power supply, reference numerals 12 and 13 designate capacitors, reference numeral 14 designates a choke coil, reference numeral 15 designates a discharge lamp, reference numeral 16 designates a high voltage pulse generator, reference numeral 17 designates a detector, and reference numeral 18 designates a lighting controller. An LC series resonance circuit consists of the capacitors 12 and 13 and the choke coil 14. The power supply 11 is connected to the capacitor 12, the choke coil 14, the high voltage pulse generator 16 and the detector 17 so as to start and operate the discharge lamp 15. The power supply 11 has a direct current power supply 19, a high frequency inverter 20 for driving the discharge lamp 15 via the capacitors 12 and 13 and the choke coil 14, and an oscillator 21. The oscillator 21 is controlled by the lighting controller 18, so that if the oscillation frequency of the high frequency inverter 20 becomes the resonance frequency determined by the capacitance of the capacitors 12 and 13 and the inductance of the choke coil 14 of the LC series resonance circuit, a high voltage is generated between the two terminals of the capacitor 13 connected in parallel to a series circuit of the discharge lamp 15 and the high voltage pulse generator 16. At the same time, high voltage pulses are also supplied from the high voltage pulse generator 16 between the main electrodes of the discharge lamp 15. That is, the high voltage pulse generator 16 has a pulse transformer 22, a charger circuit 23, a discharge gap 24 and a capacitor 25. A high frequency output of the charger circuit 23 is charged to the capacitor 25, then it is sent via the discharge gap 24 to the primary winding of the pulse transformer 22, so that a pulse voltage of small energy, but high enough to cause breakdown between the main electrodes in the discharge lamp 15 is outputted from the secondary winding of the pulse transformer 22 to the discharge lamp 15. In this Example, the high voltage generator 16 is connected so as to apply high voltage pulses in series to the discharge lamp 16. However, it may also connected so as to apply high voltage pulses in parallel to the discharge lamp 16. The output voltage of the secondary winding of the pulse transformer 22 is applied via the capacitor 13 to the discharge lamp 15 to cause breakdown between the discharge lamp 15. The detector 17 detects the state of the discharge lamp 15 at this time to send a detection signal to the lighting controller 18. The impedance of the detector 17 is small so as not to affect the resonance condition of the series resonance circuit, the attenuation and absorption of the generated high voltage pulses and the limit of the lamp current.

The operation of the lighting device of discharge lamp 15 having the above-mentioned structure is explained below. If an output voltage of the direct current power supply 19 is supplied via a resistor 26 to the middle point of the primary winding of a transformer 27, transistors 28, 29 are switched alternately according to a signal of the oscillator 21 and a current flows through the resistor 26, the primary winding of the transformer 27 and either of the transistors 28 and 29 so that an alternating voltage of the oscillating frequency set by the lighting controller 18 is generated at the secondary winding of the transformer 27 to actuate drivers 32 and 33 for driving field effect transistors (FETs) 30 and 31 used as switching elements. At this time, the FETs are turned on and off alternately with a rest time set by the lighting controller 18. In this circuit, the inductance component of the choke coil 14 and the secondary winding of the pulse transformer 22 acts as an inductance to limit the lamp current when the discharge lamp 15 is turned on. The capacitor 12 has a function to keep the discharge lamp 15 operating by being charged in the off periods of the FET 30 while by being discharged in the on periods of the FET 31, and it acts as a capacitance component when the resonance voltage is generated. The choke coil 14 acts to limit the lamp current, and it has also a function to act as an inductance component when the resonance voltage is generated.

In this Example, when the direct current power supply 19 is turned on, the high frequency inverter 20 oscillates at a low frequency on the order of 2 kHz at first to supply power to the series resonance circuit consisting of the capacitors 12 and 13 and the choke coil 14. If a high frequency resonance voltage generated by the resonance circuit superposes the generated low frequency voltage, the detector 17 detects the resonance voltage The lighting controller 18 increases the oscillation frequency of the high frequency inverter 20 to say about 100 kHz. If this high frequency is set around the resonance frequency of the series resonance circuit, a resonance voltage of a few hundred or a few thousand volts is generated across the two terminals of the capacitor 13. Because the charger circuit 23 included in the high voltage pulse generator 16 is connected in parallel with the capacitor 13, the input voltage of the charger circuit 23 increases as the voltage across the terminals of the capacitor 13 increases due to the resonance, so that the capacitor 13 is charged. If the voltage attains the breakdown voltage at the discharge gap 24, breakdown occurs at the discharge gap 24, and a high frequency output is inputted to the primary winding of the pulse transformer 22 via the discharge gap 24. Then, an enhanced pulse voltage is generated at the secondary winding of the pulse transformer 22, and it is applied via the capacitor 13 to the discharge lamp 15. Thus, breakdown in the area between the main electrodes of the discharge lamp 15 occurs to start the initial discharge. The capacitor 13 also has a function to prevent the feed back of the high voltage pulses to the side of the power supply 11. At this time, a resonance voltage of a few hundred to a few thousand volts generated across the capacitor 13 due the resonance has been supplied to the discharge lamp 15 beforehand. Then, a large part of starting energy necessary from the start of the initial discharge to the transfer to the arc discharge can be given by the supplied resonance voltage. Therefore, a pulse voltage of very narrow pulse width and of small energy enough to cause breakdown between the main electrodes of the discharge lamp 15 and to start the initial discharge is enough as high voltage pulses to be applied by the high voltage pulse generator 16 to the discharge lamp 15. According to the above-mentioned series of operation, the discharge lamp 15 can be started and operated easily, without being turned off during the transfer from glow discharge to arc discharge.

When the discharge lamp 15 is operated, the impedance of the discharge lamp 15 is lowered so that a large current flows through the discharge lamp 15. Therefore, the series resonance circuit consisting of the capacitors 12, 13 and the choke coil 14 cannot maintain the resonance. At this time, the detector 17 detects the start of the discharge lamp 15 by detecting a rapid change of the current flowing the series resonance circuit. Then, the lighting controller 18 controls the oscillation frequency of the high frequency inverter 20 to become, for example, on the order of about 10 kHz. Then, the lighting controller 18 controls the oscillation frequency of the inverter 20 so that when the lamp voltage is low, the oscillation frequency of the high frequency inverter 20 is lowered to increase the current flowing through the discharge lamp 15 through the choke coil 14 while when the lamp voltage is high, the oscillation frequency of the high frequency inverter 20 is increased to decrease the current flowing through the discharge lamp 15 through the choke coil 14.

In this Example, if the discharge lamp 15 is started and the impedance of the discharge lamp 15 is lowered due to the lamp current, the series resonance circuit cannot maintain the resonance and the voltage supplied between the two terminals of the capacitor 13 or the input voltage of the charger circuit 23 included in the high voltage pulse generator 16 stops the generation of high voltage pulses automatically. The input impedance of the charge circuit 23 is larger enough than that of the capacitor 13, so that the resonance conditions of the series resonance circuit are not affected by the input impedance.

As explained above, a large part of the energy needed for the transfer from the glow discharge to arc discharge of the discharge lamp 15 is supplied by the resonance voltage. Contrary to prior art, the energy the high voltage pulse generated by the high voltage pulse generator 16 is used for the energy needed for the breakdown of the discharge lamp 15. Therefore, the starting energy needed to be generated at the resonance is expected to be effective even if it is a very small quantity compared with the prior art. Especially, the peak value of the resonance voltage needed for the breakdown of the discharge lamp 15 can be decreased down to a few hundred to a few thousand kilovolts (about a tenth of prior art value). Therefore, the inductance value of the choke coil 14 can be decreased to about a tenth that of the prior art choke coil, and its voltage-proofness can also be decreased so that the volume of the choke coil 14 can be greatly decreased. The capacitors 12 and 13 can also be made compact largely because the voltage-proofness needed for them is decreased. Thus, though the number of the components needed for the starting and operating of the discharge lamp 15 increases, the size of the total lighting device can be made more compact to a large extent. Further, the output voltage of the direct current power supply 19 can be decreased largely by using resonance.

In this Example, a change in resonance current according to a change in impedance of the discharge lamp 15 is used to detect the starting and operating of the discharge lamp 15. However, another lamp characteristic such as lamp current, lamp voltage or luminous intensity useful to confirm the starting and lighting of the lamp can also be used for the detection.

The discharge gap 24 is used to generate high voltage pulses in this Example. However, other means such as a semiconductor switching device can also be used.

In this Example, when the detection signal is received from the detector 17, the lighting controller 18 changes the oscillation frequency of the high frequency inverter 20. However, other techniques to reduce the energy supplied after the initial starting can also be adopted. For example, the lighting controller 18 may change the duty ratio of the oscillation of the high frequency inverter 20. That is, the duty ratio of the FETs 30 and 31 may be changed so as to reduce the period wherein alternating voltages ar supplied by them. The output current of the direct current power source 19 may also be limited so as to reduce of the output power of the power source 19.

Further, the power supply 11 is composed of a series inverter circuit in this Example. However, such a circuit as a bridge inverter circuit which can alternate the polarity of the output voltage to get a similar effect can also be used.

The lamp current in this Example is limited using the capacitor 12 and the choke coil 14. However, the current can also be limited by the direct current power supply located at the front stage of the high frequency inverter, or by using the chopper action of a semiconductor element used in the high frequency inverter.

The high frequency inverter 20 performs the inverter action to alternate the polarity of the output voltage under resonance, while it can also send an alternating voltage of low frequency or a direct output when the discharge lamp 15 is operating.

EXAMPLE 2

Figure 3:
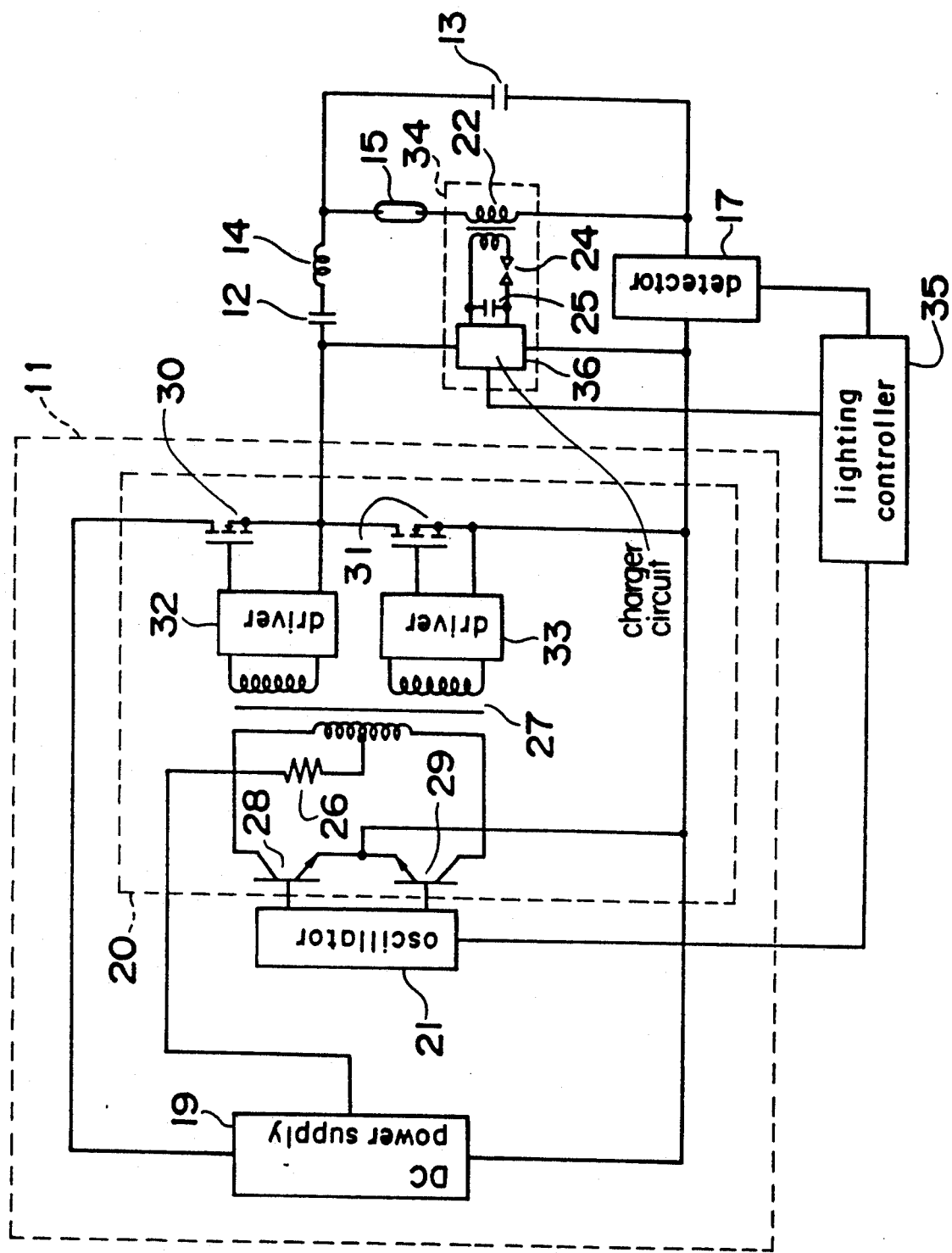
FIG. 3 is a circuit diagram of Example 2 of a starting circuit for a discharge lamp.

Next, a second Example of a starting circuit for a discharge lamp as illustrated in FIG. 3 will be explained below, wherein reference numeral 11 designates a power supply, reference numerals 12 and 13 designate capacitors, reference numeral 14 designates a choke coil, reference numeral 15 designates a discharge lamp, reference numeral 34 designates a high voltage pulse generator, reference numeral 17 designates a detector, and reference numeral 35 designates a lighting controller. A series resonance circuit consists of the capacitors 12, 13 and the choke coil 14. A charger circuit 36 of the high voltage pulse generator 34 is connected to an input terminal of the power supply 11 or between the drain and the source of an FET 31. If the charger circuit 36 receives an output signal from the lighting controller 35 according to a signal sent from the detector 17, the charging circuit 36 stops the generation of high voltage pulses by stopping the charging. The following fundamental operation is similar to that of Example 1: When electrical power is supplied to the starting circuit for the discharge lamp, high voltage pulses are applied to the discharge lamp 15 from the high voltage pulse generator 34 accompanied with the generation of the resonance voltage, and the discharge lamp 15 is started and operated.

In Example 1, the stopping of the application of high voltage pulses is performed automatically by using the insufficient charging to the high voltage pulse generator 16 according to the elimination of resonance conditions of the series resonance circuit consisting of the capacitors 12 and 13 and the choke coil 14 or according to the lowering of the voltage generated across the two terminals of the capacitors 13 accompanied with the starting and operating of the discharge lamp 15. However, such a technique has a problem in that after the discharge lamp 15 is started and operating, residual charges remain owing to the time constant of the charger circuit 36, so that an unnecessary pulse voltage is generated. Thus, after the discharge lamp is turned on, flickering may happen or the discharge lamp 15 may oscillate at a high frequency after the transfer to the arc discharge.

In this Example, when the detector 17 detects the starting and operating of the discharge lamp 15 to send a signal to the lighting controller 35 and the lighting controller 35 controls the oscillation frequency of the high frequency inverter 20, the lighting controller 35 sends a signal to the high voltage pulse generator 34 at the same time in order to stop the charging of the charging circuit 36 so as to stop the generation of high voltage pulses. Therefore, just after the discharge lamp 15 is started and operating, the application of high voltage pulses to the discharge lamp 15 is stopped surely, and rapid transfer to arc discharge can be realized.

Further, in Example 2, the charging circuit 36 of the high voltage pulse generator 34 is connected to an output terminal of the power supply 11 or to an input terminal of the FETs between the drain and the source, so that the amplitude of the input impedance does not affect the resonance conditions of the series resonance circuit. Therefore, it becomes possible that the input impedance of the high voltage pulse generator 34 can be greatly decreased. Then, the time constant for charging the charger circuit 36 can be shortened, so that the frequency of the generation of high voltage pulse or the pulse interval can be narrowed. Thus, even if the energy per high voltage pulse is decreased, the number of high voltage pulses applied to the discharge lamp 15 per unit time can be increased, and the starting characteristic can be improved more than in Example 1. Further, because the energy per high voltage pulse is decreased, the charging circuit 36 and the high voltage pulse generator 34 can be made more compact.

In this Example, the high voltage pulse generator 34 is set at the side of the ground of the discharge lamp 15. However, it can also be set at the high voltage side of the discharge lamp 15. Furthermore, the phase of the generation of high voltage pulses may be synchronized with the switching of the power supply 11. In this case, the discharge lamp 15 can easily be kept operating if the phase of the generation of high voltage pulses is set between 30° and 60° or between 210° and 270°.

EXAMPLE 3

Figure 4:
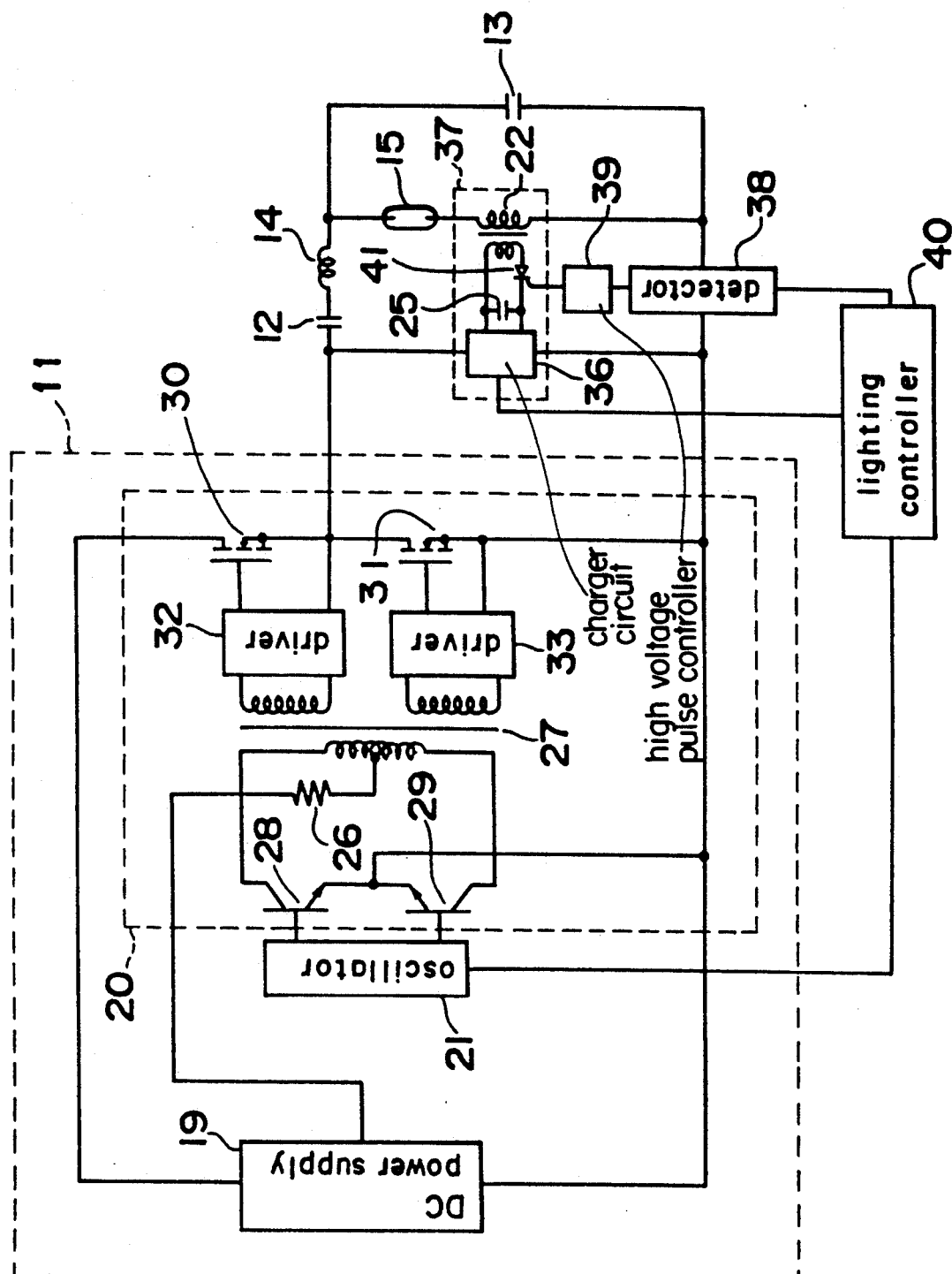
FIG. 4 is a circuit diagram of Example 3 of a starting circuit for a discharge lamp.

FIG. 4 illustrates Example 3 of a starting circuit for a discharge lamp of the present invention. In FIG. 4, reference numeral 11 designates a power supply, reference numerals 12 and 13 designate capacitors, reference numeral 14 designates a choke coil, reference numeral 15 designates a discharge lamp, reference numeral 37 designates a high voltage pulse generator, reference numeral 38 designates a detector, reference numeral 39 designates a high voltage pulse controller and reference numeral 40 designates a lighting controller. A series resonance circuit consists of the capacitors 12 and 13 and the choke coil 14. The power supply 11 has the same structure and function as that in Example 1 and it is connected via the capacitor 12, the choke coil 14, the high voltage pulse generator 37 and the detector 38 to the discharge lamp 15 for starting and lighting.

Different points of this Example from Example 1 are as follows: The detector 38 detects the starting and the operating of the discharge lamp 15 while it also detects the resonance current generated in the series resonance circuit consisting of the capacitors 12 and 13 and the choke coil 14 to find the peak value of the resonance current. Furthermore, a thyristor 41 is used as a switching element with a control terminal instead of the discharge gap 24 in Example 1. The detector 38 is arranged in a position to detect the resonance current as shown in FIG. 4 and finds the peak value of the resonance current to send a detection signal to the high voltage pulse controller 39. The high voltage pulse controller 39 is connected to the gate of the thyristor 41 in the high voltage pulse generator 37. That is, in this Example, even if a capacitor 25 connected to the output of the charging circuit 36 included in the high voltage pulse generator 37 is charged completely, the thyristor 41 is not turned on before it receives a detection signal from the high voltage pulse controller 39 and the charge in the capacitor 25 is maintained. Then, when the detector 38 detects the resonance current to find its peak value, it sends a detection signal to the high voltage pulse controller 39. Then, high voltage pulses are generated by the high voltage pulse generator 37 and they are superposed to the peak value of the resonance voltage to be applied to the discharge lamp 15. In Example 1, it is difficult to generate high voltage pulses surely around the peak of the resonance voltage, whereas in this Example, high voltage pulses can be applied to the discharge lamp 15 surely at the peak value of the resonance voltage. Therefore, the effect of the superposition of the high voltage pulses to the peak value of the resonance voltage is enhanced and it becomes possible to start the discharge lamp 15 surely.

In this Example, the resonance current is detected in order to control the generation of high voltage pulses. However, the resonance voltage may also be detected instead of the resonance current. Further, though the peak value of resonance is detected in this Embodiment, a value above a certain value to be effective to improve the starting characteristic of the discharge lamp 15 may be detected instead of the peak value in order to activate the high voltage pulse generator 37.

EXAMPLE 4

Figure 5:
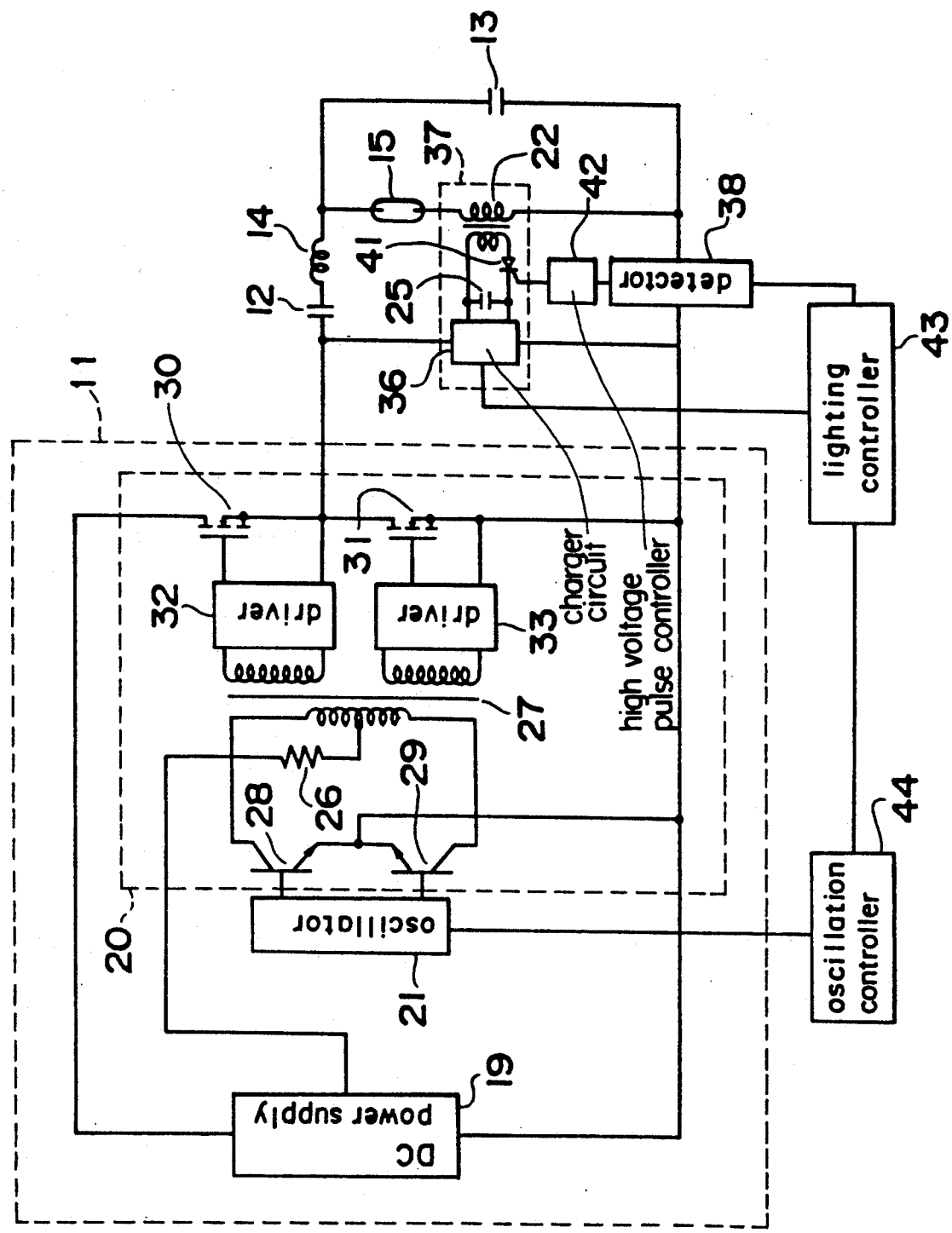
FIG. 5 is a circuit diagram of Example 4 of a starting circuit for a discharge lamp.

FIG. 5 illustrates Example 4 of starting circuit for a discharge lamp of the present invention In FIG. 5, reference numeral 11 designates a power supply, reference numerals 12 and 13 designate capacitors, reference numeral 14 designates a choke coil, reference numeral 15 designates a discharge lamp, reference numeral 37 designates a high voltage pulse generator, reference numeral 38 designates a detector, reference numeral 42 designates a high voltage pulse controller, reference numeral 43 designates a lighting controller, and reference numeral 44 designates an oscillation controller. A series resonance circuit consists of the capacitors 12 and 13 and the coil 14. The power supply 11 is connected via the capacitor 12, the choke coil 14, the high voltage pulse generator 37 and the detector 38 to the discharge lamp 15 for starting and operating.

In this Example, the oscillation controller 44 is arranged between the lighting controller 43 and controls the oscillation circuit 21 for driving the high frequency inverter 20 in the power supply 11 so as to oscillate intermittently. That is, a period wherein the oscillation is performed around the resonance frequency of the series resonance circuit and another period wherein the oscillation is stopped are repeated in turn. At the same time, in the period when the oscillation circuit 21 is operated, a signal is sent from the oscillation controller 44 via the lighting controller 43 and the detector 38 to the high voltage pulse controller 42, and the high voltage pulse generator 37 is operated to apply high voltage pulses to the discharge lamp 15 for starting and operating the lamp. Therefore, similarly to Example 3, even if a capacitor 25 connected to the output of the charging circuit 36 included in the high voltage pulse generator 37 is charged completely, the thyristor 41 is not turned on before it receives a signal from the high voltage pulse controller 42 and the charges in the capacitor 25 are maintained. Thus, the high voltage pulse generator 37 acts to apply high voltage pulses to the discharge lamp 15 to start and operated the discharge lamp 15, in synchronism with the period of the generation of resonance determined according to a signal received from the oscillation controller 44. Then, in a period wherein the oscillation around the resonance frequency is performed, the resonance voltage is supplied to the discharge lamp 15, and high voltage pulses superpose the resonance voltage. Therefore, a voltage enough to start the discharge lamp 15 can be generated. Further, because a period wherein the oscillation is stopped and the resonance current does not flow is provided, the value per unit time of resonance current flowing through the capacitors 12 and 13 and the choke coil 14 decreases. Thus, the electrical power per unit time to be supplied to the capacitors 12 and 13 and the choke coil 14 decreases when the intermittent oscillation is performed, so that the maximum output power of the power source 11 can be decreased. Therefore, the size of the power source 11 can be decreased, while the discharge lamp 15 can be started and lighted surely when the intermittent oscillation is repeated.

EXAMPLE 5

Figure 6:
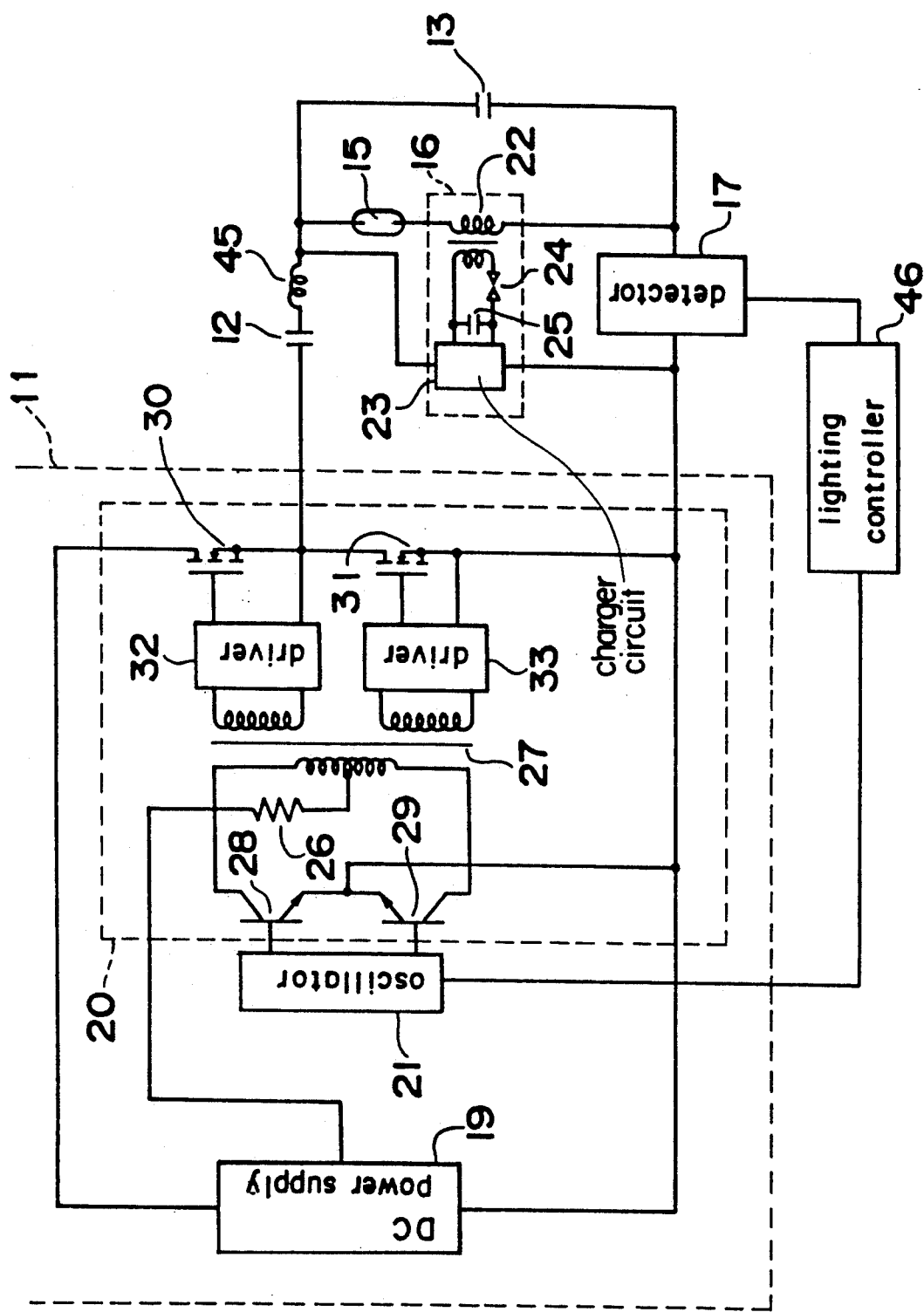
FIG. 6 is a circuit diagram of Example 5 of a starting circuit for a discharge lamp.

FIG. 6 illustrates Example 5 of a starting circuit for a discharge lamp of the present invention. In FIG. 6, reference numeral 11 designates a power supply, reference numerals 12 and 13 designate capacitors, reference numeral 45 designates a choke coil, reference numeral 15 designates a discharge lamp, reference numeral 16 designates a high voltage pulse generator, reference numeral 17 designates a detector, and reference numeral 46 designates a high voltage pulse controller. A series resonance circuit consists of the capacitors 12, 13 and the choke coil 45. The power supply 11 is connected via the capacitor 12, the choke coil 45, the high voltage pulse generator 16 and the detector 17 to the discharge lamp 15 for starting and operating the lamp.

In this Example, the lighting controller 46 has a function to control the saturation current characteristic. That is, when resonance voltage is generated or when the resonance current flows through the choke coil 45, the coke coil 45 does not saturate, whereas the choke coil 45 saturates and the inductance component vanishes just after the discharge lamp 15 is turned on or in a period wherein a large starting current flows through the choke coil 45. When electrical power is supplied to the lighting device having such a structure, in a fashion similar to that of Example 1, as the resonance voltage is generated, high voltage pulses are supplied from the high voltage pulse generator 16 to the discharge lamp 15 to start and operate the discharge lamp 15. In this Example, the choke coil 45 is controlled to saturate to eliminate the inductance component in order to generate a luminous intensity rapidly during a period when a large starting current is supplied to the discharge lamp 15 after the discharge lamp 15 is started. That is, if the detector 17 detects the starting of the discharge lamp 15, a signal is sent to the lighting controller 46, which controls the oscillation frequency of the oscillator 21 so that the choke coil 45 is saturated. Thus, the inductance component is decreased to limit the lamp current of the discharge lamp 15 to a very small value. In this Example, only the inductance component of the secondary winding of the pulse transformer 22 included in the high voltage pulse generator 16 remains as an inductance component, and the inductance component becomes about a tenth of the value when the discharge lamp 15 is operated stably. Therefore, in a period for supplying a very large starting current necessary to increase a luminous intensity rapidly, a very large starting current can be supplied to the discharge lamp 15, and a time required from the start to the stable operating of the discharge lamp 15 can be shortened.

When a starting current is supplied to the discharge lamp 15 to increase the lamp voltage of the discharge lamp 15, the gas pressure in the arctube in the discharge lamp 15 is also increased and the impedance of the discharge lamp 15 is increased. Then, the lamp current is limited and it is lower than the value just after the starting of the discharge lamp 15, and it gradually decreases to a current value at which the choke coil 45 does not saturate. Thus, the choke coil 45 recovers the inductance component rapidly, and it acts as a current-limiting element having an inductance component necessary for the stable lighting of the discharge lamp 15.

In this Example, the impedance component of the choke coil 45 recovers automatically owing to the increase in impedance of the discharge lamp 15 after the supply of the starting current. Instead, for example, such a control may also be adopted to recover the inductance component by detecting the increase in lamp voltage.

EXAMPLE 6

Figure 7:
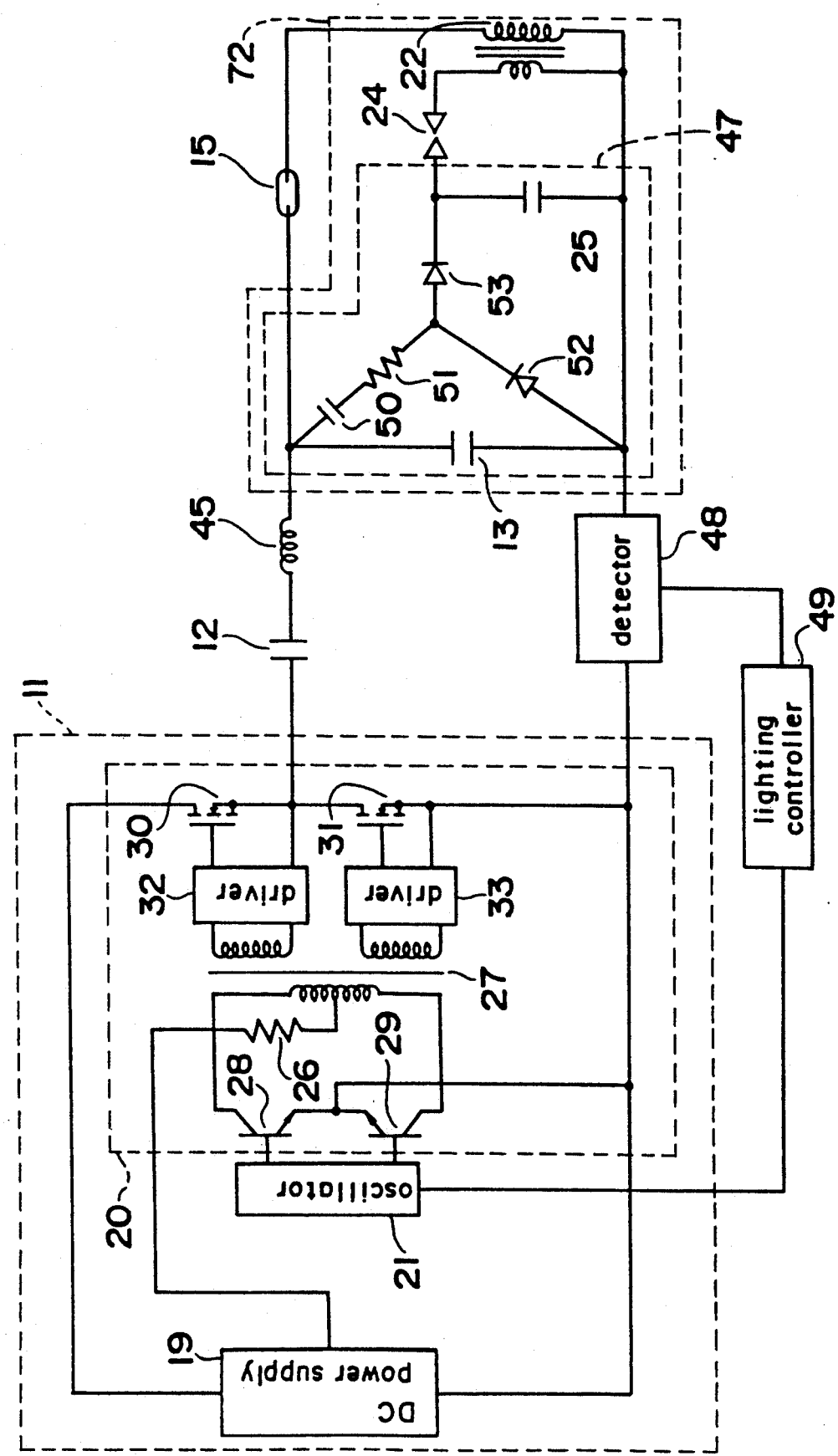
FIG. 7 is a circuit diagram of Example 6 of a starting circuit for a discharge lamp.

FIG. 7 illustrates Example 6 of a starting circuit for a discharge lamp of the present invention. In FIG. 7, reference numeral 11 designates a power supply, reference numerals 12 and 13 designate capacitors, reference numeral 45 designates a choke coil, reference numeral 15 designates a discharge lamp, reference numeral 72 designates a high voltage pulse generator, reference numeral 48 designates a detector, and reference numeral 49 designates a lighting controller. A series resonance circuit consists of the capacitors 12 and 13 and the choke coil 45. The power supply 11 is connected via the capacitor 12, the choke coil 45, the high voltage pulse generator 72 and the detector 48 to the discharge lamp 15 for starting and operating the discharge lamp 15. In this Example, the high voltage pulse generator 72 includes a charging circuit 47 including the capacitor 13 of the series resonance circuit, a discharge gap 24 and a pulse transformer 22. The charging circuit 47 has a voltage doubling and rectifying circuit including capacitors 13, 50 and 25, a resistor 51, and diodes 52 and 53.

This Example is characterized in that an input terminal of the voltage doubling and rectifying circuit used as a charging circuit 47 is connected to the two terminals of the capacitor 13 included in the LC series resonance circuit with the choke coil 45. That is, the resonance voltage generated at the two terminals of the capacitor 13 is rectified to charge the capacitor 25 with a voltage necessary to cause breakdown at the discharge gap 24. When the voltage charged in the capacitor 25 attains a high voltage enough to cause breakdown at the discharge gap 24, breakdown occurs at the discharge gap 24 and the generated pulse voltage enhanced by the pulse transformer 22 is applied to the discharge lamp 15 and breakdown occurs between the main electrodes in the discharge lamp 15. According to this series of operation, the discharge lamp 15 is started and operated.

When breakdown occurs between the main electrodes in the discharge lamp 15, the impedance of the discharge lamp 15 decreases and the resonance conditions of the LC resonance circuit do not hold. Then, the voltage for charging at the two terminals of the capacitor 25 becomes deficient and the generation of high voltage pulses stops rapidly. However, even after breakdown occurs between the main electrodes of the discharge lamp 15 to start glow discharge, the transfer to the arc discharge does not occur in the discharge lamp 15 due to, for example, the deficient starting energy. Thus, the impedance of the discharge lamp 15 increases again so that the resonance conditions of the LC series vibration circuit recovers and the capacitor 25 is charged at a high voltage. Then, the high voltage pulse generator 72 acts to generate high voltage pulses to be applied to the discharge lamp 15. By repeating such an operation, the discharge lamp 15 transfers completely to arc discharge to attain stable operation. The fundamental operation of the power supply 11 including the high frequency inverter 20 is the same as in Example 1.

This Example is also characterized in that the capacitor 25 in the high voltage pulse generator 72 is charged by rectifying a high voltage of high frequency generated on resonance, and this makes it easy to get a high enough voltage to cause breakdown at the discharge gap 24 by using a simple circuit structure. In other words, a sufficiently high voltage can be realized using a voltage multiplying circuit of a relatively low order. Thus, a charger circuit 47 can be made more compact to a greater extent than previously possible.

In the structure of the voltage doubling and rectifying circuit of the charger circuit 47, the resistor 51 plays a role of a limit resistance for preventing the self sustaining discharge at the discharge gap 24. However, it can be replaced with another technique to prevent the self sustaining discharge at the discharge gap 24. The resistor 51 can also be arranged in a place, for example, in series with the diode 52 if the effect of this Example can be realized. In this Example, a voltage doubling and rectifying circuit is used. However, a rectifying circuit such as a tripling or quadrupling and rectifying circuit can also be used. If the resonance voltage which is generated at the two terminals of the capacitor 13 is surely large enough to cause breakdown at the discharge gap 24, a rectifying circuit without the voltage multiplying function can also be used. In this example, the resonance voltage generated at the two terminals of the capacitor 13 in the LC series circuit is used for rectifying. However, the resonance voltage at the choke coil 45 may also be used.

EXAMPLE 7

Figure 8:
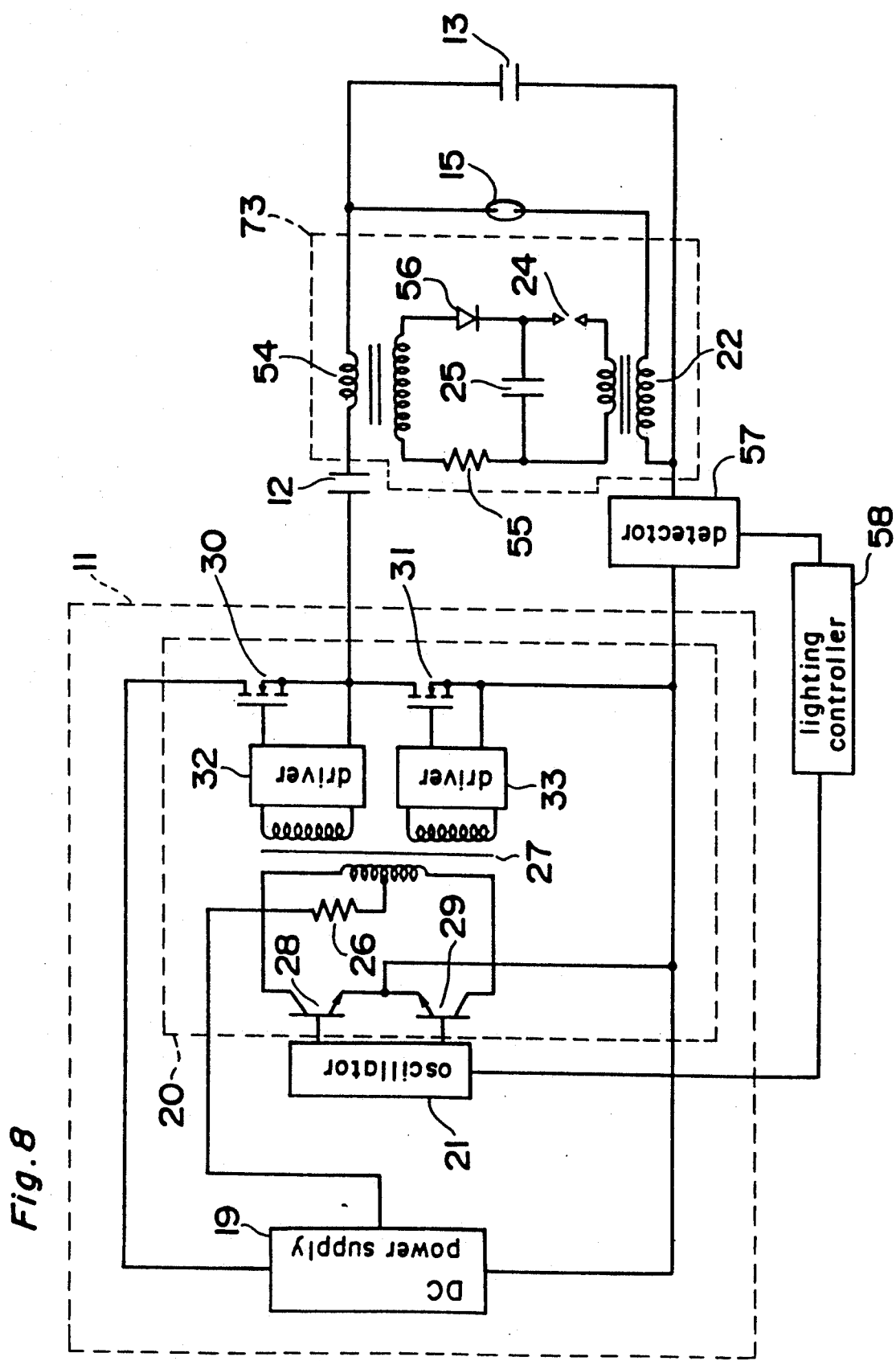
FIG. 8 is a circuit diagram of Example 7 of a starting circuit for a discharge lamp.

FIG. 8 illustrates Example 7 of a starting circuit for a discharge lamp of the present invention. In FIG. 8, reference numeral 11 designates a power supply, reference numerals 12 and 13 designate capacitors, reference numeral 54 designates a transformer whose primary winding consists of an LC series resonance circuit with the capacitors 12 and 13, reference numeral 15 designates a discharge lamp, reference numeral 73 designates a high voltage pulse generator including the transformer 54, reference numeral 57 designates a detector, and reference numeral 58 designates a lighting controller. The power supply 11 is connected via the capacitor 12, the high voltage pulse generator 73 and the detector 57 to the discharge lamp 15 for starting and lighting the discharge lamp 15. The high voltage pulse generator 73 has the secondary winding of the transformer 54 as input terminals and a rectifying circuit as a charger circuit which includes a capacitor 25, a diode 56, a discharge gap 24 and a pulse transformer 22.

This Example has a characteristic that the input terminals of the high voltage pulse generator 73 are connected to the secondary winding of the transformer 54 whose primary winding is included in the LC series resonance circuit. That is, the voltage generated at the two terminals of the primary winding of the transformer 54 due to the LC series resonance circuit is multiplied and rectified by transmitting it to the secondary winding of the transformer 54, so that a voltage necessary to cause breakdown at the discharge gap 24 is charged in the capacitor 25. When the voltage charged in the capacitor 25 attains the voltage necessary to cause breakdown, breakdown occurs at the discharge gap 24, and the pulse voltages generated are multiplied by the pulse transformer 22 and supplied to the discharge lamp 15. Then, breakdown occurs between the main terminals of the discharge lamp 15. The fundamental procedure wherein the discharge lamp 15 is started and operated in the above-mentioned series of operation is similar to that in Example 1.

A characteristic of this Example is that the resonance voltage generated due to the LC series resonance is multiplied using a transformer so that a voltage necessary for breakdown at the discharge gap can be charged in the capacitor using a rectifying circuit without a function to multiply the voltage. That is, the resonance voltage generated at the two terminals of the primary winding of the transformer 54 can be multiplied to a desired voltage easily by adjusting the number of turns of the secondary winding. Therefore, the voltage multiplying process can be omitted, and the rectifying circuit can be made more compact with a less weight.

In a fashion similar to Example 6, the resistance 55 included in the rectifying circuit plays a role of a limit resistor in order to prevent self sustaining discharge at the discharge gap 24. If another means to limit the self-sustaining discharge is used, the resistor 55 can be omitted. Further, the resistor 55 may also be arranged, for example, in series to the diode 56 and the effect of this Example is not deteriorated.

EXAMPLE 8

Figure 9:
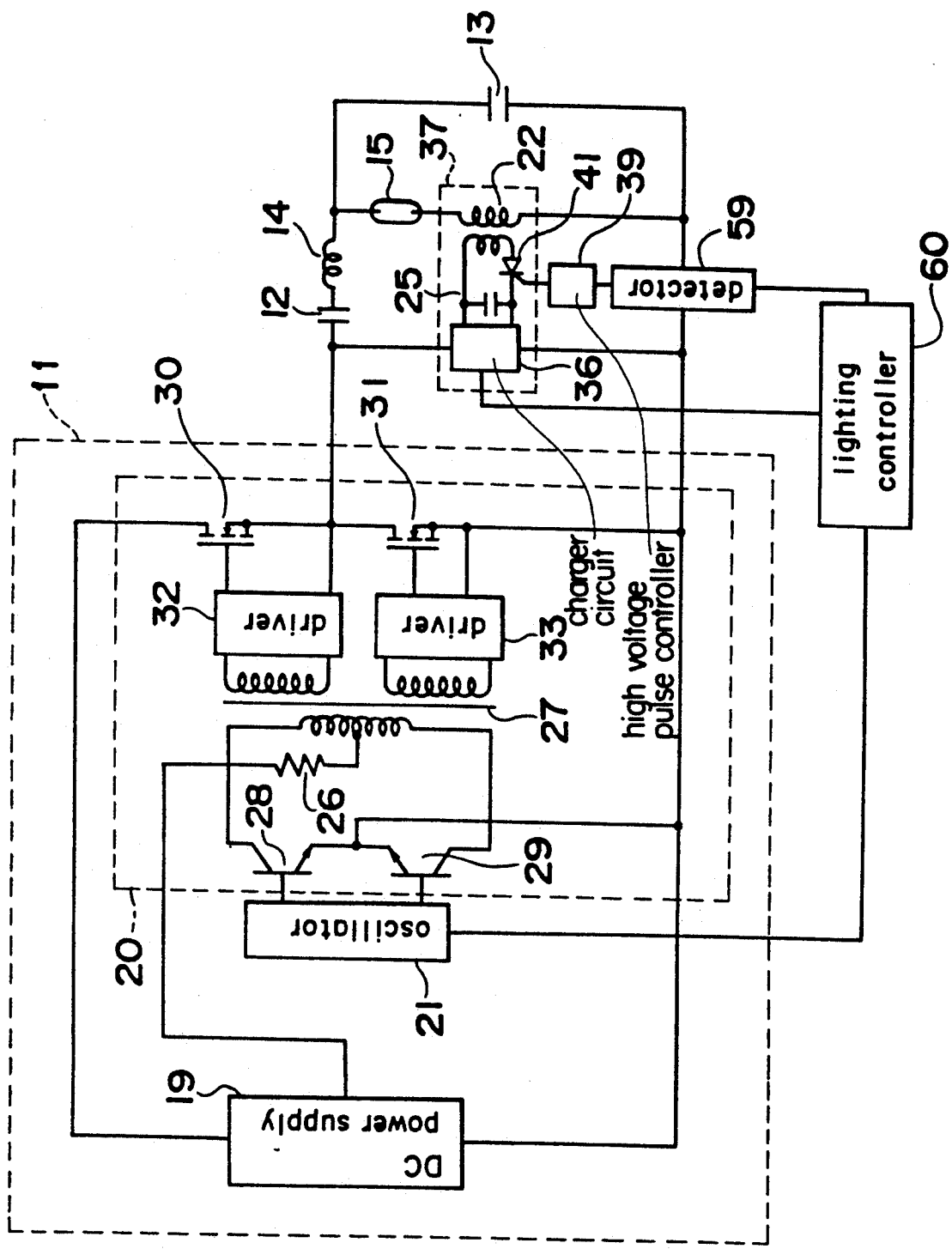
FIG. 9 is a circuit diagram of Example 8 of a starting circuit for a discharge lamp.

FIG. 9 illustrates Example 8 of a starting circuit for a discharge lamp of the present invention. In FIG. 9, reference numeral 11 designates a power supply, reference numerals 12 and 13 designate capacitors, reference numeral 14 designates a choke coil, reference numeral 15 designates a discharge lamp, reference numeral 37 designates a high voltage pulse generator, reference numeral 59 designates a detector, reference numeral 39 designates a high voltage pulse controller, and reference numeral 60 designates a lighting controller. A series resonance circuit consists of the capacitors 12, 13 and the choke coil 14. The power supply 11 is connected via the capacitor 12, the choke coil 14, the high voltage pulse generator 37 and the detector 59 to the discharge lamp 15 for starting and operating the discharge lamp 15, similar to Example 1.

Figure 10:
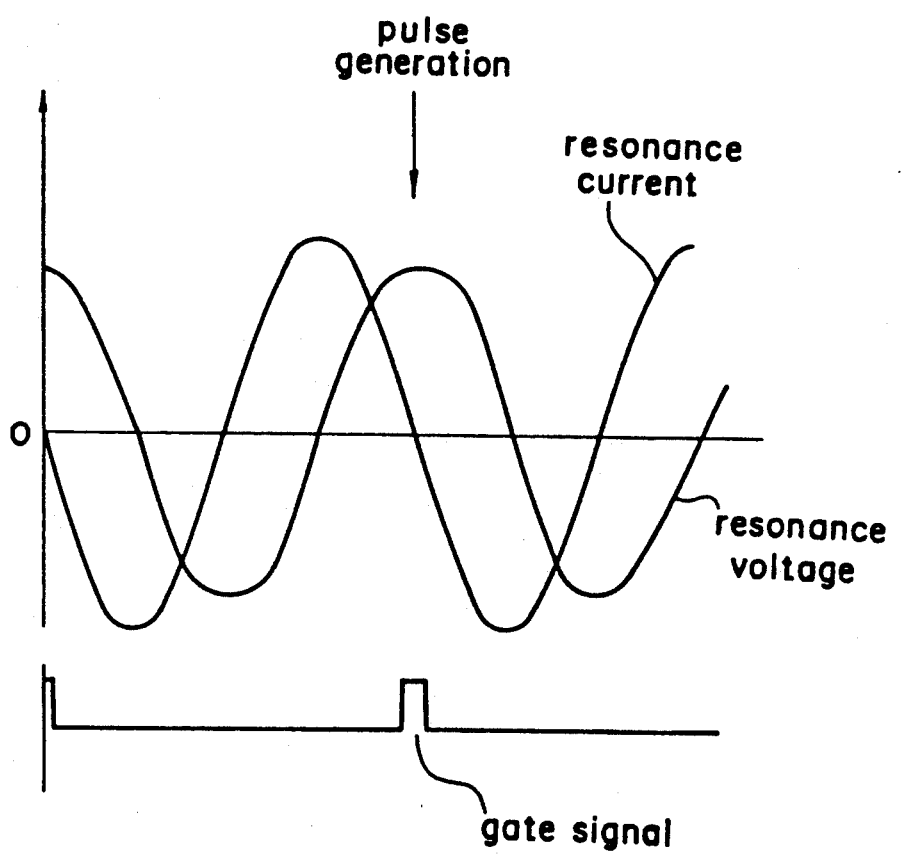
FIG. 10 is a diagram of a phase control of a starting circuit for a discharge lamp of Example 9.

This Example differs from Example 1 as to the detector 59, which has a function to detect the starting and operating of the discharge lamp 15 and a function to detect a peak value of the resonance voltage with a phase shifted by 90° by detecting the resonance current generated in the series resonance circuit. Further, in this Example, a thyristor 41 is used as a switching element having a control terminal instead of the discharge gap 24 in Example 1 and the detector 59 is arranged in a position wherein the resonance current can be detected as shown in FIG. 9. The detector 59 detects the peak value of the resonance voltage to send a detection signal to the high voltage pulse controller 39 which is connected to the gate terminal of the thyristor 41 of the high voltage pulse generator 37. That is, in this Example, even if a capacitor 25 which is connected to the output of a charging circuit 36 included in the high voltage pulse generator 37 is charged completely, the thyristor 41 is not turned on before it receives a signal from the high voltage pulse controller 39, and the charge in the capacitor 25 is maintained. Then, when the detector 59 detects the resonance current to find the peak value of the resonance voltage and sends a signal to the high voltage pulse controller 39, as shown in FIG. 10, high voltage pulses are generated by the high voltage pulse generator 37 and they ar superposed on the peak value of the resonance voltage to be applied to the discharge lamp 15. That is, the gate signal is controlled to turn on the thyristor 41 around the peak value of the phase of the resonance voltage generated across the two terminals of the capacitor 13. In Examples 1 and 3, it is difficult to generate high voltage pulses surely around the peak of the resonance voltage, whereas in this Example, high voltage pulses can be applied to the discharge lamp 15 surely at the peak value of the resonance voltage, so that the effect of the superposition of the high voltage pulse to the peak value is enhanced and it becomes possible to start the discharge lamp 15 surely.

In this Example, the detector 59 detects the resonance current. However, the resonance voltage may also be detected instead of the resonance current. Further, in this Example, the peak value of resonance current is detected. However, a value above a certain value to be effective to improve the starting characteristic of the discharge lamp 15 may be detected instead of the peak value in order to activate the high voltage pulse generator 37.

EXAMPLE 9

Figure 11:
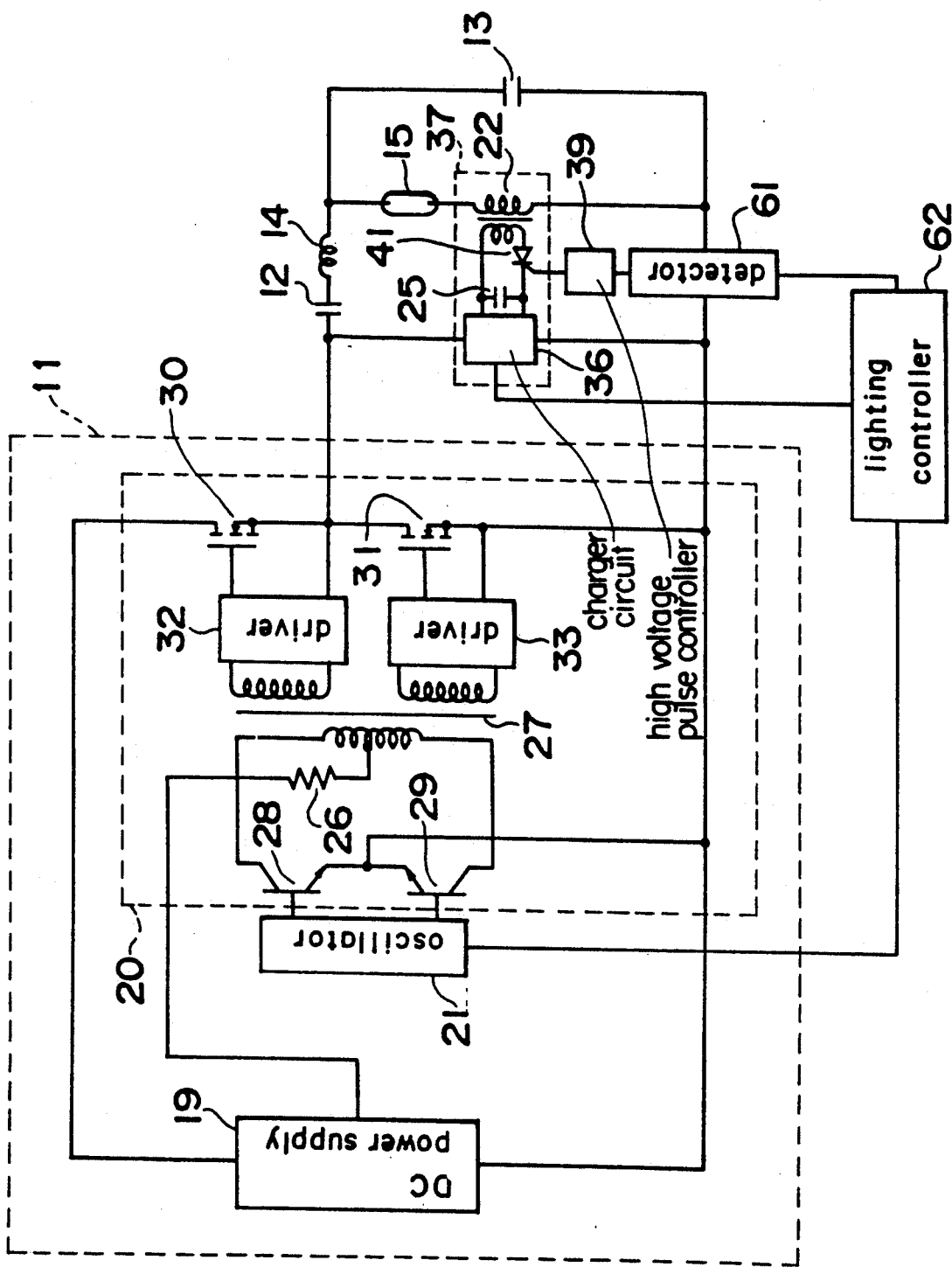
FIG. 11 is a circuit diagram of Example 9 of a starting circuit for a of discharge lamp.

FIG. 11 illustrates Example 9 of a starting circuit for a discharge lamp of the present invention. In FIG. 11, reference numeral 11 designates a power supply, reference numerals 12 and 13 designate capacitors, reference numeral 14 designates a choke coil, reference numeral 15 designates a discharge lamp, reference numeral 37 designates high a voltage pulse generator, reference numeral 61 designates a detector, and reference numeral 39 designates a high voltage pulse controller, and numeral 62 designates a lighting controller. A series resonance circuit consists of the capacitors 12 and 13 and the choke coil 14. The power supply 11 is connected via the capacitor 12, the choke coil 14, the high voltage pulse generator 37 and the detector 61 to the discharge lamp 15 for starting and operating the discharge lamp 15.

Figure 12:
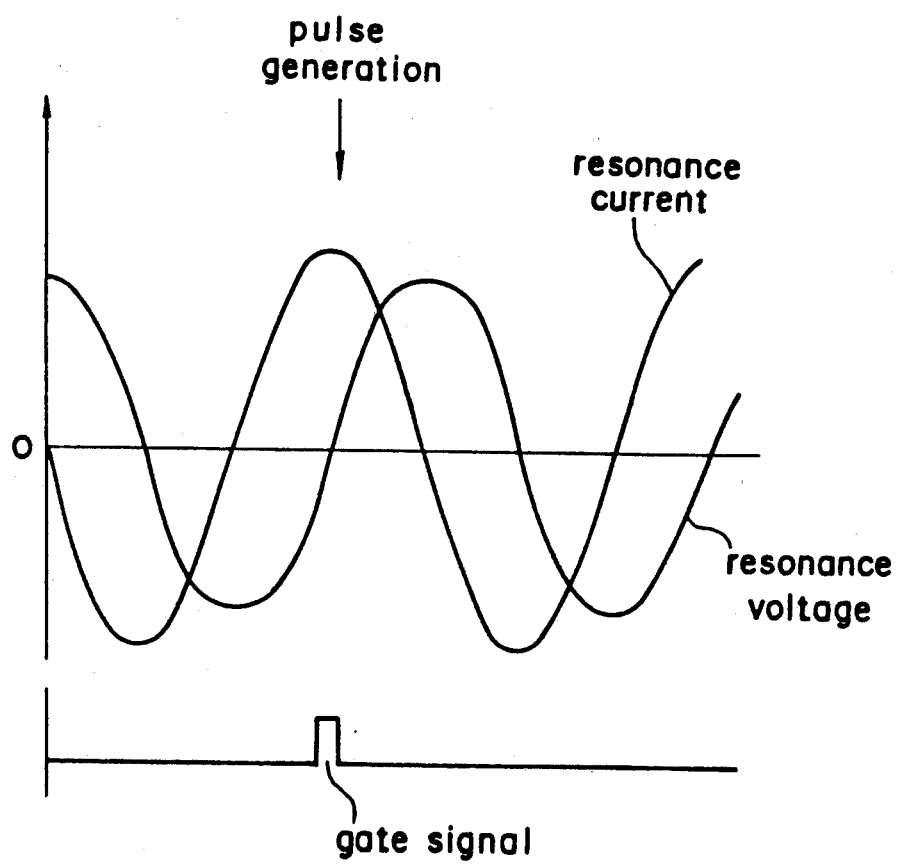
FIG. 12 is a diagram of phase control of a starting circuit for the of discharge lamp of Example 9.

This Example differs from Example 1 as to the detector 61, which has a function to detect the starting and operating of the discharge lamp 15 and a function to find a peak value of the resonance current by detecting the resonance current generated in the series resonance circuit consisting of the capacitors 12 and 13 and the choke coil 14. Further, in this Example, a thyristor 41 is used as a switching element having a control terminal, instead of the discharge gap 24 in Example 1, and the detector 61, arranged in a position wherein the resonance current can be detected as shown in FIG. 11, detects the peak value of the resonance current to send a detection signal to the high voltage pulse controller 39 which is connected to the gate terminal of the thyristor 41 in the high voltage pulse generator 37. That is, in this Example, even if the capacitor 25 connected to the output of the charging circuit 36 included in the high voltage pulse generator 37 is charged completely, the thyristor 41 is not turned on before it receives a signal from the high voltage pulse controller 39, and the charge in the capacitor 25 is maintained. Then, when the detector 61 finds the peak value of the resonance current by detecting the resonance current and sends a signal to the high voltage pulse controller 39, high voltage pulses are generated by the high voltage pulse generator 37 as shown in FIG. 12 and it is superposed on the peak value of the resonance current to be applied to the discharge lamp 15. That is, the gate signal is controlled to turn on the thyristor 41 around the peak value of the resonance current generated at the two terminals of the capacitor 13. In Examples 1 and 3, it is difficult to generate high voltage pulses surely around the peak of the resonance current, whereas in this Example, high voltage pulses can be applied to the discharge lamp 15 surely at the peak value of the resonance current. Thus, it becomes possible to supply a large starting current necessary for an energy needed for the transfer from glow discharge to arc discharge after the start of the discharge lamp 15. Initially, the starting energy is supplied mainly by the energy the high voltage pulses applied to the discharge lamp and if only the starting energy of the high voltage pulse is available, an energy necessary for the transfer form the glow discharge to the arc discharge is deficient. Thus, the discharge lamp 15 is liable to be turned off just after the breakdown. On the contrary, according to this Example, a starting energy can be supplied surely even if an energy of high voltage pulse is decreased, and the discharge lamp 15 can be started more surely than in Examples 1 and 3 even if the high voltage pulse generator 37 is made more compact.

In this Example, the detector 61 detects the resonance current. However, the resonance voltage may also be detected instead of the resonance current. Further, in this Example, the peak value of resonance current is detected. However, a current value above a certain value to be effective to improve the starting characteristic of the discharge lamp 15 may be used instead of the peak value in order to activate the high voltage pulse generator 37.

EXAMPLE 10

Figure 13:
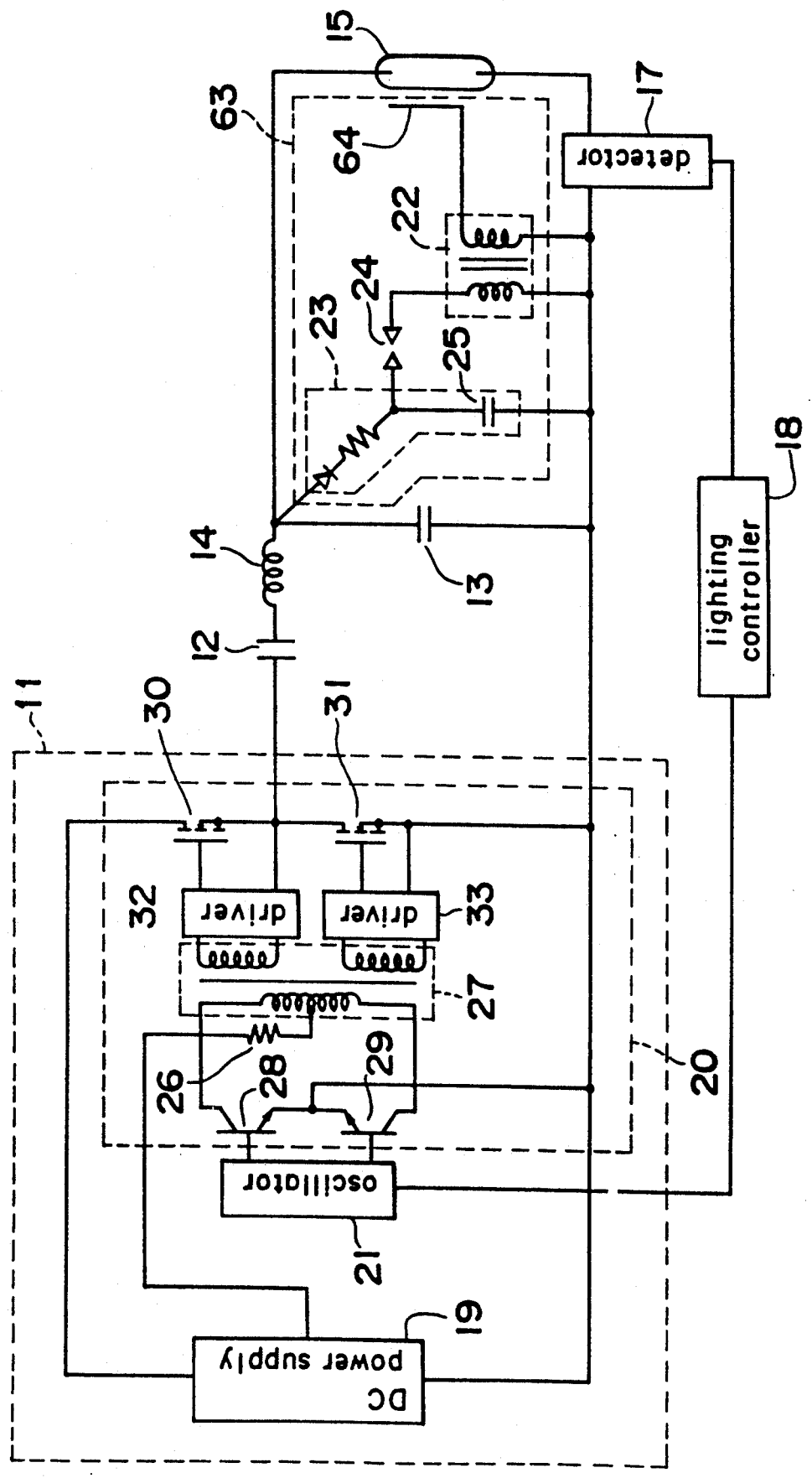
FIG. 13 is a circuit diagram of Example 10 of a starting circuit for a discharge lamp.

FIG. 13 is a circuit diagram of Example 10 of a starting circuit for a discharge lamp, wherein reference numeral 11 designates a power supply, reference numerals 12 and 13 designate capacitors, reference numeral 14 designates a choke coil, reference numeral 15 designates a discharge lamp, reference numeral 63 designates a high voltage pulse generator, reference numeral 17 designates a detector, and reference numeral 18 designates a lighting controller. A series resonance circuit consists of the capacitors 12 and 13 and the choke coil 14. The power supply 11 has the same structure and function as in Example 1. The power supply 11 is connected via the capacitor 12, the choke coil 14 and the detector 17 to start and operate the discharge lamp 15 after the discharge lamp 15 is started by the high voltage pulse generator 63.

This Example differs from Example 1 as to the high voltage pulse generator 63, which includes a charging circuit 23 connected in parallel to the capacitor 13 included in an LC series resonance circuit, a capacitor 25 connected to an output terminal of the charging circuit 23, a discharge gap 24, a pulse transformer 22 and an auxiliary electrode 64 connected to an output terminal of the secondary winding of the pulse transformer 22 and arranged in an arctube of the discharge lamp 15 or around the discharge lamp 15 externally as shown in FIG. 13.

When the power supply 11 is turned on, a resonance voltage is generated across the two terminals of the capacitor 13, and the high frequency output of the charging circuit 23 connected in parallel to the capacitor 13 is supplied to the capacitor 25 for charging. When the voltage charged in the capacitor 25 attains the breakdown voltage at the discharge gap 24, breakdown occurs at the discharge gap 24, and a pulse energy is inputted via the discharge gap 24 to the primary winding of the pulse transformer 22. The output voltage of the pulse transformer 22 is applied via the auxiliary electrode 64 to the discharge lamp 15 to cause breakdown between the main electrodes.

The control operation of the lighting controller 18 after the breakdown to stable lighting and the fundamental operation of the power supply 11 including the high frequency inverter 20 are the same as in Example 1. The auxiliary electrode 64 for starting does not affect the lamp characteristics on operating.

This Example has a characteristic that the high voltage pulses generated at the secondary winding of the pulse transformer 22 are applied to the discharge lamp 15 via the auxiliary electrode 64 arranged in the arctube of the discharge lamp 15 or around the discharge lamp 15 externally. The auxiliary electrode 64 acts as a proximate conductor arranged in the arctube of the discharge lamp 15 or around the discharge lamp 15 externally, and it has an effect to lower the starting voltage of the discharge lamp 15 by shortening the distance between the main electrodes. Therefore, pulses which can restrike the discharge lamp 15 may be of a lower voltage when compared with such a case as in Example 1 wherein high voltage pulses generated in the secondary winding of the pulse transformer 22 are applied directly to the discharge lamp 15.

Then, the voltage generated in the high voltage pulse generator 63 can be set lower than that in Example 1, and it is possible to lower the output voltage of the charging circuit 23 and the pulse transformer 22 so that the high voltage pulse generator 63 can be made more compact than the counterpart 16 in Example 1.

EXAMPLE 11

Figure 14:
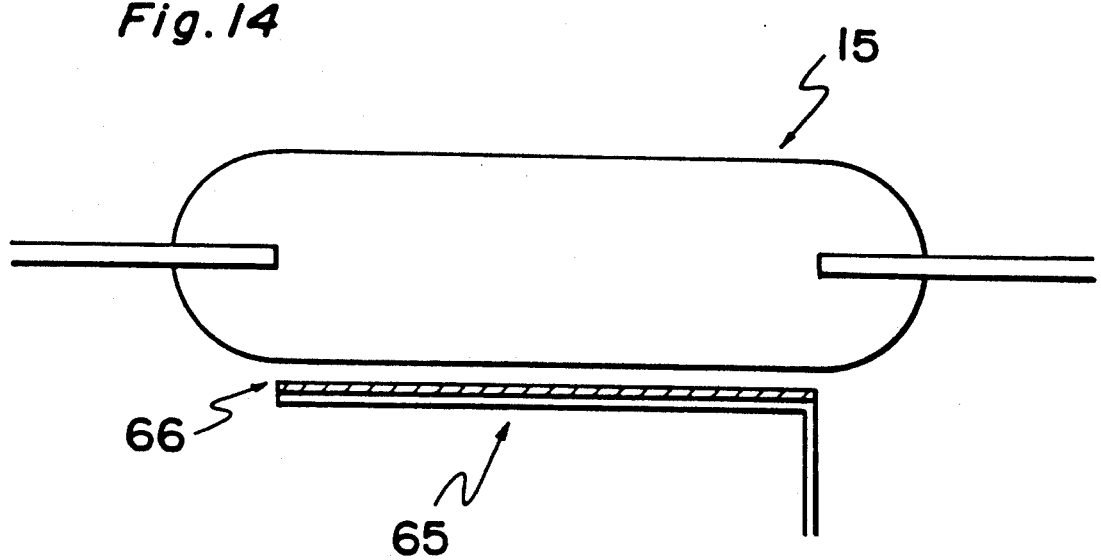
FIG. 14 is a circuit diagram of Example 11 of a starting circuit for a discharge lamp.

Example 11 is the same as Example 10 except for the auxiliary electrode of the discharge lamp 15. FIG. 14 displays the structure of a discharge lamp 15 and an auxiliary electrode 65 for starting which is arranged around the discharge lamp 15 externally. The structure and the function of the components except the auxiliary electrode 65 are similar to those in Example 10.

This Example differs from Example 10 as to the auxiliary electrode 65 for starting, which is characterized in that at least a plane of the auxiliary electrode 65 opposing the arctube of the discharge lamp 15 is covered with an insulator 66, as shown in FIG. 14.

In general, when an auxiliary electrode for starting is arranged externally near the arctube of the discharge lamp in order to make the starting of the discharge lamp easier, the decrease in luminous intensity due to the loss of the transparency of the arctube is a problem to be solved. This is ascribed to the negative charging of the auxiliary electrode when the discharge lamp is operated. That is, when the auxiliary electrode is illuminated by the discharge of the discharge lamp, photoelectrons are emitted, and the auxiliary electrode is charged negatively by them when the discharge lamp 15 is operated. The metal enclosed in the arctube as iodides are ionized when the discharge lamp is operated and exist as ions in the arctube. Among the ions, sodium ions have positive charges and their ionic radius is especially small. Therefore, if the auxiliary electrode located near the external wall of the arctube is charged negatively, sodium ions are attracted to the auxiliary electrode and permeate through the quartz crystals of the arctube to flow out of the arctube. Then, the arctube becomes opaque and the life of the discharge lamp becomes shorter due to the loss of transparency or the like.

On the contrary, the auxiliary electrode 65 of this Example is characterized to be covered with an insulator 66 at least on a plane opposing the arctube of the discharge lamp 15. Therefore, the light radiating the auxiliary electrode 65 from the discharge lamp 15 under operation can be shielded without losing the effects of the auxiliary electrode 65 that the distance between the main electrodes of the discharge lamp 15 can be shortened due to the existence of the auxiliary electrode 65 and that the voltage needed for starting can be decreased. Therefore, photoelectrons are not emitted from the auxiliary electrodes 65 when the discharge lamp 15 is operated, and the auxiliary electrode 65 is not charged negatively, so that the loss of transparency of the arctube due to the flow of sodium ions can be prevented. Thus, a lighting device can be provided wherein the starting voltage of the discharge lamp 15 is lowered and the life of the lamp due to the loss of transparency or the like can be prevented.

The insulator 66 is a material such as a ceramic or a glass which does not conduct electrons. It is not deteriorated at high temperatures near the arctube and does not affect the lamp characteristics.

Figure 15:
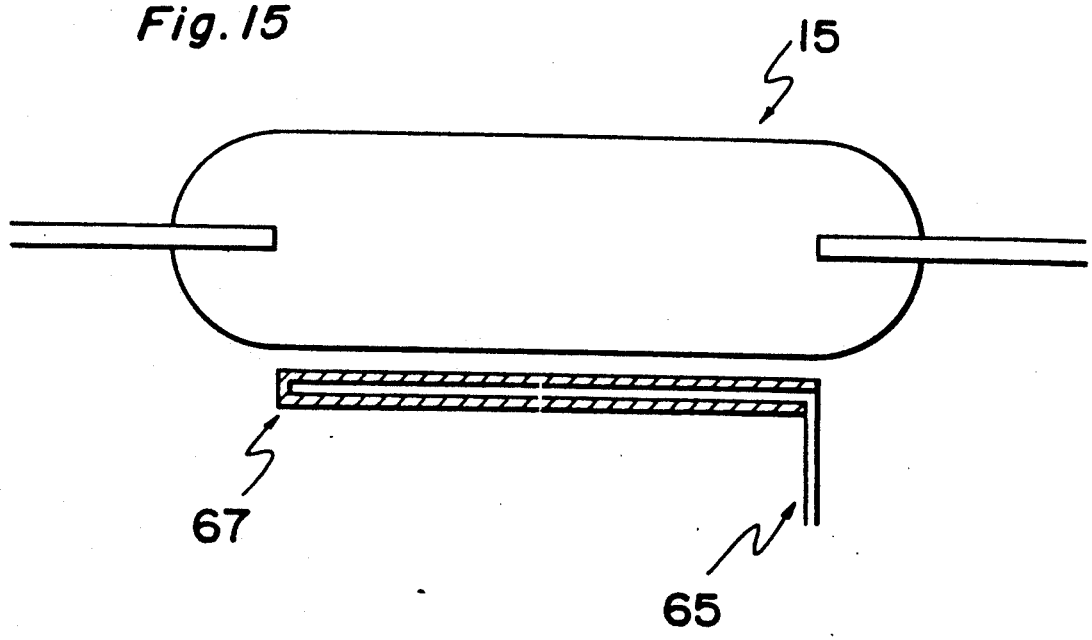
FIG. 15 is another circuit diagram of the starting circuit for the discharge lamp of Example 11.

In this Example, the surface of the auxiliary electrode 65 is covered only on a plane opposing the arctube. However, as shown in FIG. 15, the auxiliary element 65 may be covered completely with a sheath-like insulator 67.

EXAMPLE 12

Figure 16:
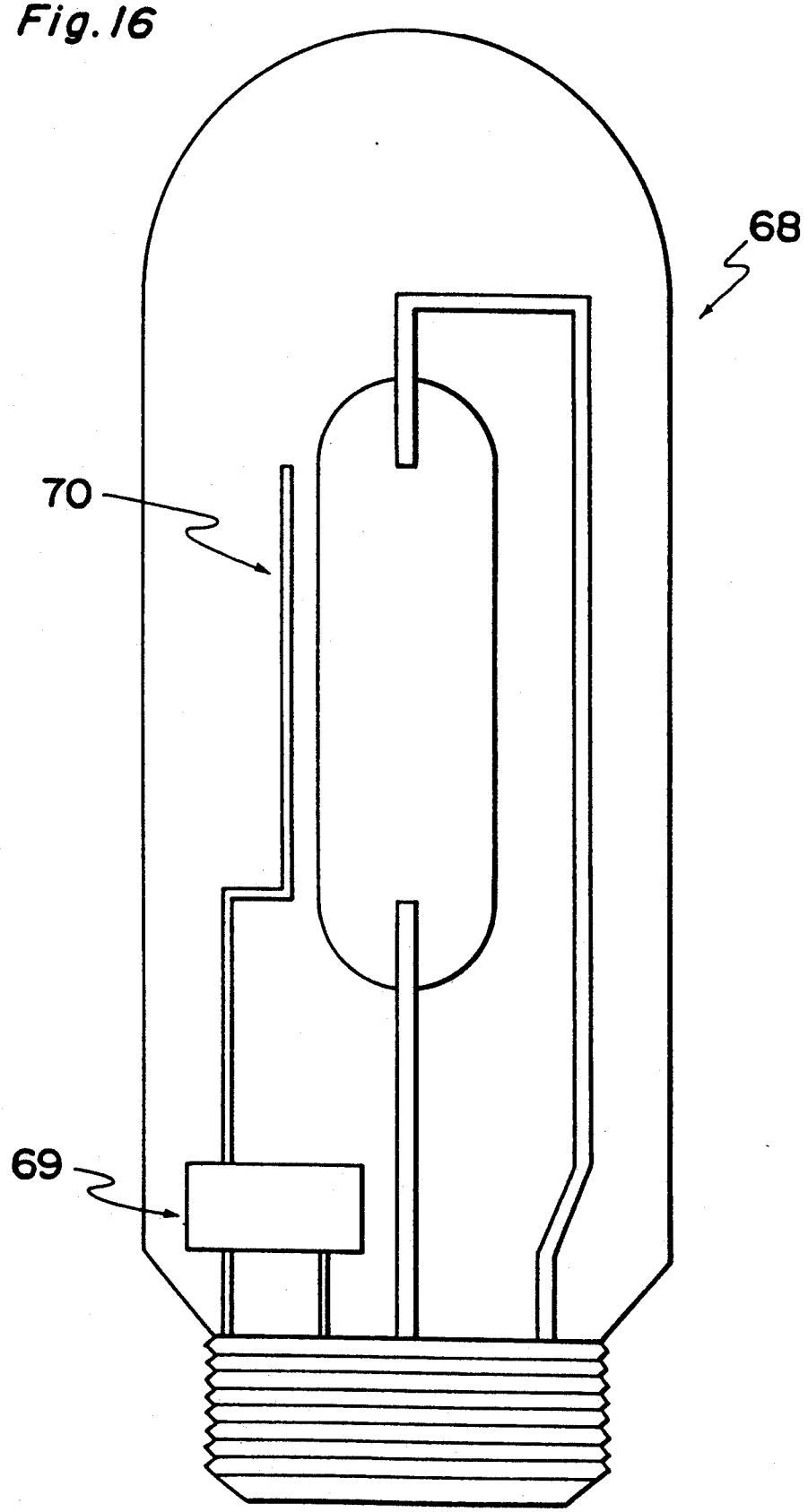
FIG. 16 is a circuit diagram of Example 12 of discharge lamp.

Example 12 is similar to Example 10 except for the structure of the discharge lamp 68. FIG. 16 illustrates a discharge lamp 68 of a lighting device of discharge lamp according to Example 12.

In this Example, the lighting operation is the same fundamentally as in Example 10. When the discharge lamp 68 is started, high voltage pulses are applied from the high voltage pulse generator 69 via the auxiliary electrode 70 to the discharge lamp 15 and breakdown occurs between the main des of the discharge lamp 65 to transfer to the stable lighting.

This Example differs from Example 10 as to the arrangement of the high voltage pulse generator 69, which is characterized to be enclosed in the discharge lamp 68.

In this Example, when the discharge lamp 68 is started, high voltage pulses are generated by the high voltage pulse generator 69 via the auxiliary electrode 70 by superposing the resonance voltage supplied from the external of the discharge lamp 68, and they are applied to the discharge lamp 68. The high voltage pulses for starting the discharge lamp 68 can be generated inside the lamp, so that the attenuation due to the long distance transmittance of the pulses can be decreased very much and the radiation noises from the pulse transformer and the pulse transmission lines which exist outside the discharge lamp 68 can be prevented. Further, because the attenuation of the pulses is small, the wave height of the high voltage pulses generated by the high voltage pulse generator 69 can be decreased and the high voltage pulse generator 69 can be made more compact.

The high voltage pulse generator 69 does not shield light radiating from the discharge lamp 68 under operation, and it does not affect the lighting characteristics of the discharge lamp 68.

The discharge lamp 68 shown in FIG. 16 has a one base type structure. However, it may have a a double base type structure.

EXAMPLE 13

Figure 17:
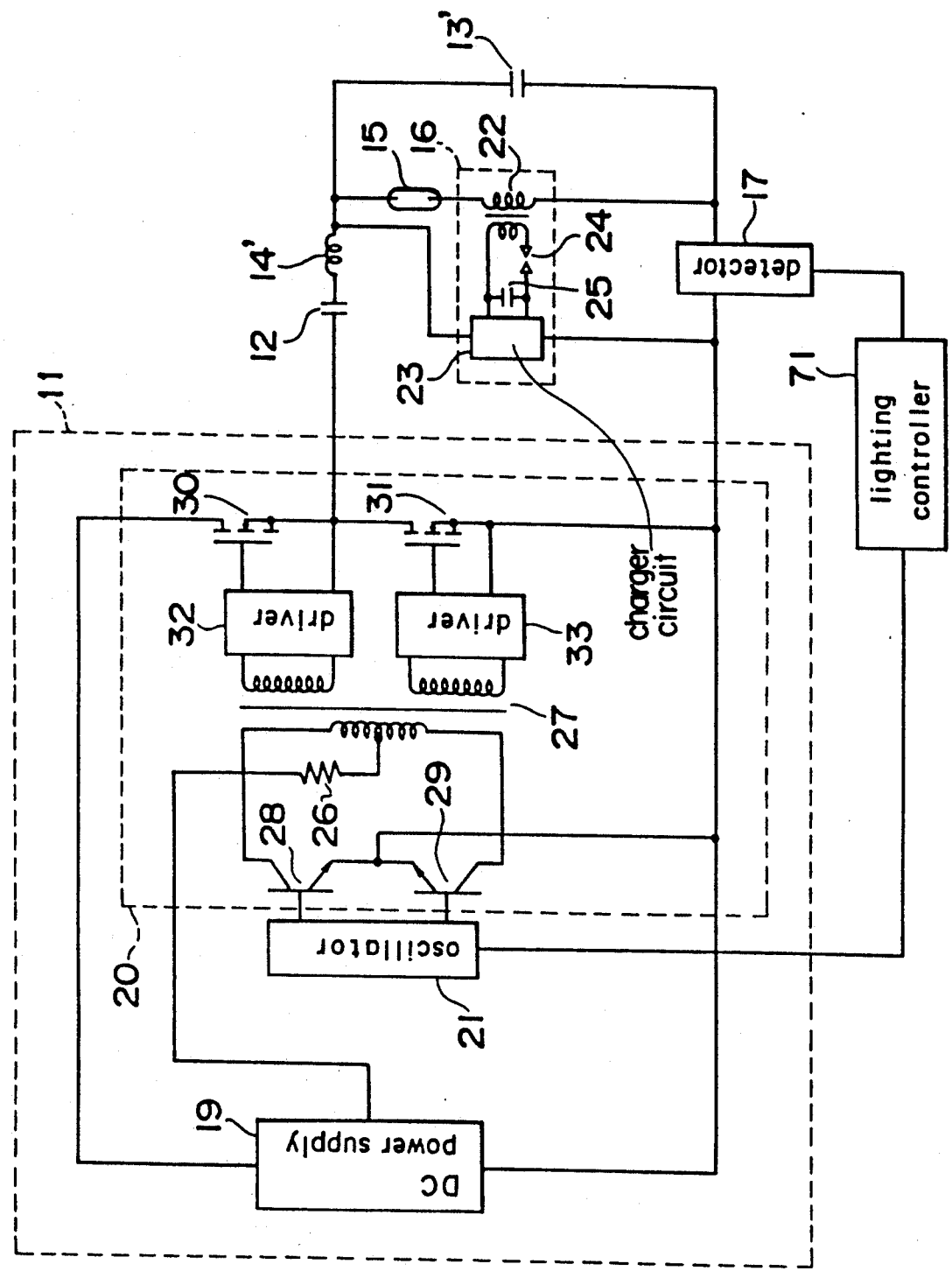
FIG. 17 is a circuit diagram of Example 13 of a starting circuit for a discharge lamp.

Example 13 is similar to Example 1 fundamentally. FIG. 17 illustrates Example 13 of a starting circuit for a discharge lamp, wherein reference numeral 11 designates a power supply, reference numerals 12 and 13' designate capacitors, reference numeral 14' designates a choke coil, reference numeral 15 designates a discharge lamp, reference numeral 16 designates a high voltage pulse generator, reference numeral 17 designates a detector, and reference numeral 71 designates a lighting controller. An LC series resonance circuit consists of the capacitors 12, 13' and the choke coil 14'. The power supply 11 is connected to the capacitor 12, the choke coil 14', the high voltage pulse generator 16 and the detector 17 so as to start and operate the discharge lamp 15. The power supply 11 has a direct current power supply 19, a high frequency inverter 20 for driving the discharge lamp 15 via the capacitors 12 and 13' and the choke coil 14', and an oscillator 21.

Figure 18A:
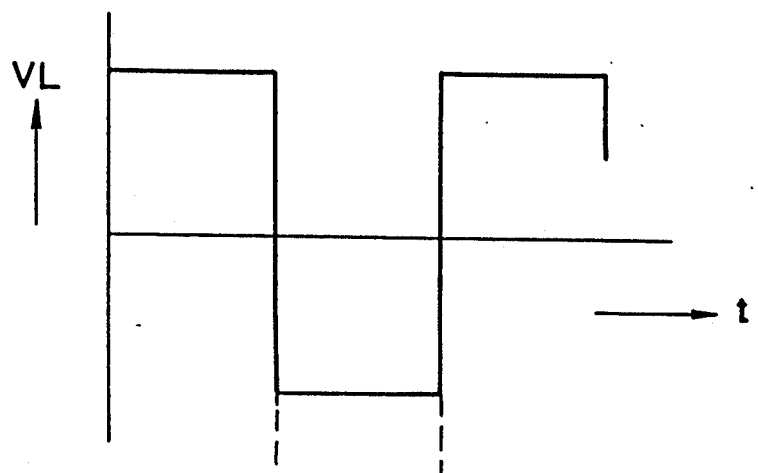
FIGS. 18(a)-18(c) are diagrams of resonance voltage and current of the starting circuit of Example 13.
Figure 18B:
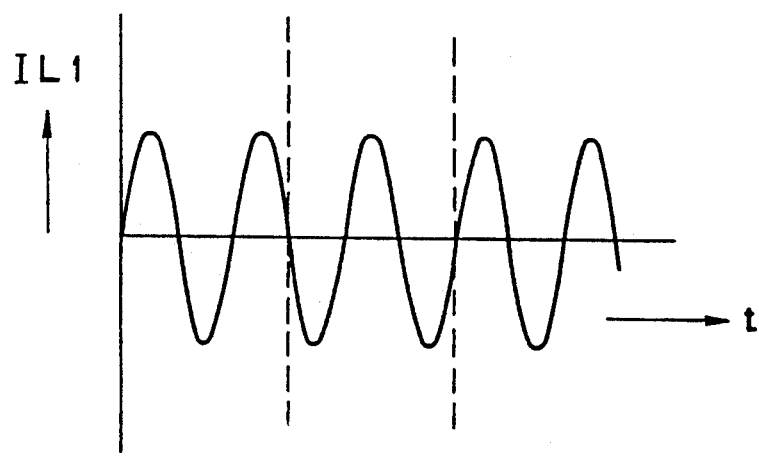
Figure 18C:
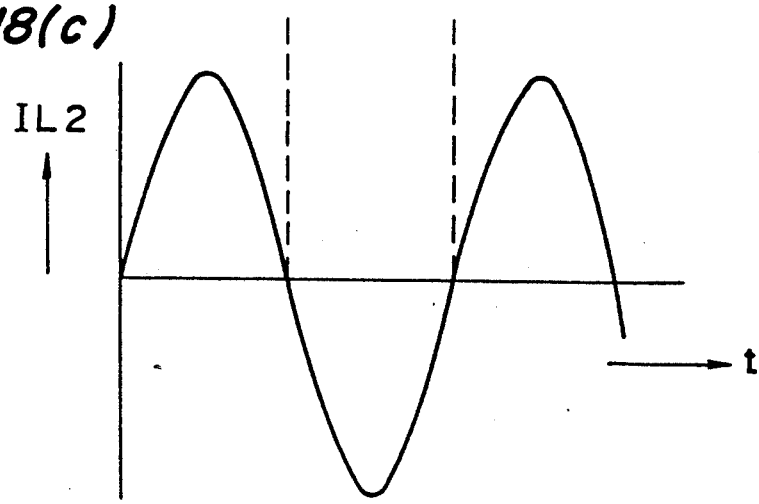

This Example is characterized in that the impedance of the LC series resonance circuit consisting of the capacitor 13' and the choke coil 14', or the inductance of the choke coil 14' and the capacitance of the capacitor 13', is set so as to make resonance with the third harmonic wave shown in FIG. 18(b) of the output shown in FIG. 18(a) of the high frequency inverter 20, and that the lighting controller 71 operates to control that the oscillation frequency of the high frequency inverter 20 is changed according to the state of the discharge lamp 15 and the oscillation frequency can also be set to be the fundamental frequency as shown in FIG. 18(c) determined according to the impedance of the resonance circuit. In FIGS. 18(a)–18(c), VL designates the output voltage of the high frequency inverter 20, while IL1 and IL2 designate current forms of the third harmonic wave and of the fundamental wave flowing through the choke coil 14, respectively.

The operation of the lighting controller 71 of this Example for starting a discharge lamp 15 in the cool state will be explained below. The cool state means a state wherein a sufficient time passes after the lamp is turned off and the gas pressure, the temperature or the like in the arctube decrease sufficiently when compared with the counterparts during lighting or just after the turn off of the discharge lamp 15. When the direct current power supply 19 is turned on, similarly to the lighting device of Example 1, the high frequency inverter 20 oscillates at first at a low frequency of about 2 kHz and provides a voltage of the low frequency to the series resonance circuit. If a high frequency resonance voltage generated by the resonance circuit superposes the low frequency voltage, the detector 17 detects the resonance voltage. When the resonance voltage is detected, the lighting controller 71 changes the oscillation frequency of the high frequency inverter 20 to a frequency of say about 33 kHz. This frequency is set to be about the third harmonic of the fundamental resonance frequency determined by the impedance of the LC series resonance circuit. Then, a resonance voltage of a few thousand volts is generated across the two terminals of the capacitor 13' to be supplied to the discharge lamp 15. Then, breakdown occurs between the main electrodes of the discharge lamp 15, and the initial discharge is started.

The operation of the high frequency inverter 20 after the breakdown to the stable lighting is similar to in Example 1. That is, when breakdown occurs between the main electrodes in the discharge lamp 15 and the initial discharge is started, the starting current generated by the resonance flows via the choke coil 14 to the discharge lamp 15. According to this series of operation, the discharge lamp 15 can be started and operated without being turned off during the transfer from glow discharge to arc discharge.

Next, the operation of the lighting controller 71 of this Example for starting (restriking) the discharge lamp 15 in the hot state will be explained below. The hot state means a state wherein a sufficient time does not pass after the discharge lamp 15 is turned off and the gas pressure, the temperature or the like in the arctube are higher than the counterparts in the cool state. In this case, the operation is the same as in Example 1 after the direct current power supply 19 is turned on and the detector 17 detects the resonance voltage.

In this Example, the detector 17 also has a function to detect the lamp state by detecting the lamp temperature such as the surface temperature of the arctube of the discharge lamp 15 or the temperature of the environment around the discharge lamp 15 and to decide if the discharge lamp 15 is in the cool state or in the hot state. If the discharge lamp 15 is detected to be in the hot state, the lighting controller 71 changes the oscillation frequency of the high frequency inverter 20 up to say about 100 kHz higher than the frequency at the starting according to the detection signal from the detector 17. This frequency is set around the fundamental frequency determined by the impedance of the LC series resonance circuit, and a resonance voltage higher than that on the resonance with use of the third harmonic is generated across the two terminals of the capacitor 13' to be supplied to the discharge lamp 15. Then, breakdown occurs between the main electrodes of the discharge lamp 15, and the initial discharge is started. After the initial discharge is started, the starting current generated by the resonance flows via the choke coil 14' to the discharge lamp 15 and the glow discharge in the discharge lamp 15 transfers to arc discharge. The oscillation frequency of the high frequency inverter 20 is controlled in order to operate the discharge lamp 15 in the rated conditions. The action of the lighting controller 71 after the initial discharge is started and the control technique of the oscillation frequency are the same as in the cool state.

In general, when the discharge lamp 15 is started in the cool state, the electrode temperature is low. Therefore, even if breakdown occurs between the main electrodes, the discharge vanishes often during the transfer from glow discharge to arc discharge because the starting energy is deficient. A high voltage is not necessary for the transfer. However, it is necessary for the resonance current to be large enough to increase the electrode temperature sufficiently. Therefore, if the energy for transfer from glow discharge to arc discharge is supplied by the resonance circuit of the power supply as in this Example, it is preferable that the resonance frequency be low.

In this Example, the high frequency inverter 20 is operated at about 33 kHz though the fundamental resonance frequency is about 100 kHz when the discharge lamp is started in the cool state. Therefore, though the resonance voltage is low due to the resonance at a frequency lower than the fundamental resonance frequency, sufficient energy can be supplied to the discharge lamp 15 due to a large resonance current, so that the starting characteristic of the discharge lamp 15 in the cool state can be improved.

Further, the third harmonic of the fundamental frequency is used as the resonance frequency in this Example. Then, if the inductance value is taken constant for determining the resonance conditions in order to prevent the enlargement of the choke coil 14', the capacitance of the capacitor 13' does not need to be three times that for the resonance at the fundamental frequency though the resonance occurs at a frequency of a third of the fundamental resonance frequency. Therefore, the enlargement of the capacitor for generating a large resonance current needed to supply starting energy to the discharge lamp 15 can be prevented. If the capacitance 13' connected in parallel with the discharge lamp 15 becomes larger, the discharge lamp 15 becomes harder to start because the lamp current has a rest period, or flickering occur or the discharge may vanish in a period after the starting. However, such problems can be avoided, while the starting circuit can be made more compact and the starting characteristic can be improved.

When the discharge lamp 15 is restruck in the hot state, the energy to be supplied to the discharge lamp 15 for the transfer from glow discharge to arc discharge can be decreased when compared with the starting in the cool state, because the electrode temperature is high sufficiently.

However, because the temperature and the pressure in the arctube are high in the hot state, a higher starting voltage is required than for the start in the cool state. Therefore, the high frequency inverter 20 is operated at the fundamental frequency to supply a higher resonance voltage than in the start in the cool state in order to more easily cause breakdown between the main electrodes.

Thus, the starting characteristic of the lighting device can be improved irrespective of the state of the discharge lamp 15. Further, the lighting device can be made more compact to a great extent.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A starting circuit for a discharge lamp, comprising:
   a resonance circuit including a series circuit comprising a coil and a first capacitor;
   a discharge lamp connected to the connection of said coil and said capacitor of the series circuit of said resonance circuit so that the voltage between the two terminals of said capacitor of said resonance circuit is applied to the discharge lamp;
   an oscillator circuit for supplying an alternating voltage to said resonance circuit through a driver circuit, said oscillator circuit oscillating at a first frequency around the resonance frequency of said series circuit and at a second frequency different from the first frequency;
   a pulse generator connected to said discharge lamp for supplying pulses having a voltage which is high enough to cause a breakdown in said discharge lamp;
   a detector for detecting a lamp characteristic which can be used to confirm the starting of said discharge lamp; and
   a lighting controller for controlling the operating of said discharge lamp by causing said oscillator circuit to oscillate at said first frequency when said detector fails to confirm the starting of said lamp and for causing said oscillator circuit to stop after said detector confirms the starting of said lamp;
   further comprising an oscillation controller for controlling said oscillator circuit to oscillate intermittently so that a first period wherein the oscillation is performed and a second period wherein the oscillation is stopped are repeated in turn, and a pulse controller for generating a signal to operate said pulse generator synchronously with the generation of a resonance voltage in response to a signal from said oscillation controller in a period when said oscillator circuit is oscillating.

2. A starting circuit according to claim 1, wherein said lighting controller controls said oscillator circuit according to the lamp characteristic detected by said detector.

3. A starting circuit according to claim 1, wherein said lighting controller controls the duty ratio of the oscillation of said oscillator circuit according to the lamp characteristic detected by said detector.

4. A starting circuit according to claim 1, wherein said resonance circuit includes a second capacitor which is connected in series with said series circuit of said resonance circuit and to said oscillator circuit.

5. A starting circuit according to claim 1, wherein said lamp characteristic detected by said detector a resonance voltage of said resonance circuit.

6. A starting circuit for a discharge lamp, comprising:
   a resonance circuit including a series circuit comprising a coil and a first capacitor;
   a discharge lamp connected to the connection of said coil and said capacitor of the series circuit of said resonance circuit so that the voltage between the two terminals of said capacitor of said resonance circuit is applied to the discharge lamp;
   an oscillator circuit for supplying an alternating voltage to said resonance circuit through a driver circuit, said oscillator circuit oscillating at a first frequency around the resonance frequency of said series circuit and at a second frequency different from the first frequency;
   a pulse generator connected to said discharge lamp for supplying pulses having a voltage which is high enough to cause a breakdown in said discharge lamp;
   a detector for detecting a lamp characteristic which can be used to confirm the starting of said discharge lamp; and
   a lighting controller for controlling the operating of said discharge lamp by causing said oscillator circuit oscillate at said first frequency when said detector fails to confirm the starting of said lamp and for causing said oscillator circuit to stop after said detector confirms the starting of said lamp;
   further comprising an oscillation controller for controlling said oscillator circuit to oscillate intermittently so that a first period wherein the oscillation is performed and a second period wherein the oscillation is stopped are repeated in turn, and a pulse controller for generating a signal to operate said pulse generator synchronously with the generation of a resonance voltage in response to a signal from said oscillation controller in a period when said oscillator circuit is oscillating;
   wherein said pulse generator has a rectifying circuit for rectifying a voltage of said resonance circuit for supplying said pulses.

7. A starting circuit according to claim 6, wherein said pulse generator has a second capacitor for charging from a voltage generated by said rectifying circuit and a discharge gap connected to said second capacitor for generating said pulses.

8. A starting circuit for a discharge lamp, comprising:
   a resonance circuit including a series circuit comprising a coil and a first capacitor;
   a discharge lamp connected to the connection of said coil and said capacitor of the series circuit of said resonance circuit so that the voltage between the two terminals of said capacitor of said resonance circuit is applied to the discharge lamp;
   an oscillator circuit for supplying an alternating voltage to said resonance circuit through a driver circuit, said oscillator circuit oscillating at a first frequency around the resonance frequency of said series circuit and at a second frequency different from the first frequency;
   a pulse generator connected to said discharge lamp for supplying pulses having a voltage which is high enough to cause a breakdown in said discharge lamp;
   a detector for detecting a lamp characteristic which can be used to confirm the starting of said discharge lamp; and
   a lighting controller for controlling the operating of said discharge lamp by causing said oscillator circuit oscillate at said first frequency when said detector fails to confirm the starting of said lamp and for causing said oscillator circuit to stop after said detector confirms the starting of said lamp;
   further comprising an oscillation controller for controlling said oscillator circuit to oscillate intermittently so that a first period wherein the oscillation is performed and a second period wherein the oscillation is stopped are repeated in turn, and a pulse controller for generating a signal to operate said pulse generator synchronously with the generation of a resonance voltage in response to a signal from said oscillation controller in a period when said oscillator circuit is oscillating;
   wherein said pulse generator has a second capacitor for charging from a voltage generated by a rectifying circuit and a discharge gap connected to said second capacitor for generating said pulses, whereby said voltage supplied to said second capacitor is high enough to cause breakdown in said discharge gap to generate said pulses.

9. A starting circuit according to claim 8, wherein a primary winding of a transformer is provided as said coil of said resonance circuit and a secondary coil of the transformer is connected to a input of the rectifying circuit.

10. A starting circuit for a discharge lamp, comprising:
   a resonance circuit including a series circuit comprising a coil and a first capacitor;
   a discharge lamp connected to the connection of said coil and said capacitor of the series circuit of said resonance circuit so that the voltage between the two terminals of said capacitor of said resonance circuit is applied to the discharge lamp;
   an oscillator circuit for supplying an alternating voltage to said resonance circuit through a driver circuit, said oscillator circuit oscillating at a first frequency around the resonance frequency of said series circuit and at a second frequency different from the first frequency;
   a pulse generator connected to said discharge lamp for supplying pulses having a voltage which is high enough to cause a breakdown in said discharge lamp;
   a detector for detecting a lamp characteristic which can be used to confirm the starting of said discharge lamp; and
   a lighting controller for controlling the operating of said discharge lamp by causing said oscillator circuit oscillate at said first frequency when said detector fails to confirm the starting of said lamp and for causing said oscillator circuit to stop after said detector confirms the starting of said lamp;
   further comprising an oscillation controller for controlling said oscillator circuit to oscillate intermittently so that a first period wherein the oscillation is performed and a second period wherein the oscillation is stopped are repeated in turn, and a pulse controller for generating a signal to operate said pulse generator synchronously with the generation of a resonance voltage in response to a signal from said oscillation controller in a period when said oscillator circuit is oscillating;

wherein said pulse generator applies said pulses to said discharge lamp via an auxiliary electrode for starting, said auxiliary electrode being set inside an actube of said discharge lamp.

11. A starting circuit according to claim 10, wherein at least a plane of an auxiliary electrode is coated with an electrically insulating material, said plane being located counter to the arctube of said discharge lamp.

12. A starting circuit according to claim 10, wherein said high frequency pulse generator is installed inside said discharge lamp.

13. A starting circuit according to claim 1, wherein said lamp characteristic detected by said detector is a resonance current of said resonance circuit.

14. A starting circuit according to claim 5, wherein said detector detects said resonance current which rises above a predetermined value, further comprising a pulse controller for generating a trigger pulse to operate said pulse generator according to a signal received from said detector, said pulse generator having a switch element with a control terminal for supplying pulses to said discharge lamp in response to a trigger signal from said pulse controller.

* * * * *

UNITED STATES PATENT AND TRADEMARK OFFICE
CERTIFICATE OF CORRECTION

PATENT NO. : 5,233,273

DATED : August 3, 1993

INVENTOR(S) : Atsuo Waki et al.

It is certified that error appears in the above-identified patent and that said Letters Patent is hereby corrected as shown below:

Cover Page, Item [75], after "Takatsuki," insert --Kazutaka Koyama, Nishinomiya,--.

Signed and Sealed this

Twenty-second Day of March, 1994

Attest:

BRUCE LEHMAN

*Attesting Officer*  *Commissioner of Patents and Trademarks*